US011243095B2

(12) United States Patent
Yamamoto et al.

(10) Patent No.: US 11,243,095 B2
(45) Date of Patent: Feb. 8, 2022

(54) ROTATIONAL ANGLE DETECTION APPARATUS AND ROTATIONAL ANGLE DETECTION METHOD

(71) Applicant: Asahi Kasei Microdevices Corporation, Tokyo (JP)

(72) Inventors: Takeo Yamamoto, Tokyo (JP); Ryuta Tanaka, Tokyo (JP); Satoshi Fukase, Tokyo (JP); Kenta Sogo, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 368 days.

(21) Appl. No.: 16/382,193

(22) Filed: Apr. 12, 2019

(65) Prior Publication Data

US 2019/0316939 A1 Oct. 17, 2019

(30) Foreign Application Priority Data

Apr. 13, 2018 (JP) .............................. JP2018-077490
Apr. 11, 2019 (JP) .............................. JP2019-075821

(51) Int. Cl.
*G01D 5/244* (2006.01)
(52) U.S. Cl.
CPC ..... *G01D 5/24495* (2013.01); *G01D 5/24476* (2013.01)
(58) Field of Classification Search
CPC ............. G01D 5/2449; G01D 5/24476; G01D 5/04495; G01D 5/244; G01C 17/38
See application file for complete search history.

(56) References Cited

U.S. PATENT DOCUMENTS

| 7,930,148 B1* | 4/2011 | Figaro ................... G01C 17/38 |
| | | 702/196 |
| 2006/0076480 A1 | 4/2006 | Kiriyama |
| 2010/0264862 A1* | 10/2010 | Kitagawa ................. H02P 6/15 |
| | | 318/400.13 |
| 2014/0163923 A1* | 6/2014 | Takaki .................. G01D 5/244 |
| | | 702/151 |
| 2016/0011015 A1* | 1/2016 | Angelis ............. G01D 5/24428 |
| | | 324/207.25 |
| 2017/0030742 A1* | 2/2017 | Mochizuki ......... G01D 5/24476 |

* cited by examiner

*Primary Examiner* — Regis J Betsch
*Assistant Examiner* — Kaleria Knox

(57) ABSTRACT

To reduce the error in a rotational angle detected by a rotational angle detection apparatus, provided is a rotational angle detection apparatus that detects a rotational angle of a magnetic field generation source, including a magnetic field detection apparatus that detects magnetic field components in at least two directions, and outputs resulting detection data; a correction value calculating section that calculates correction values for correcting an angle error of the rotational angle, based on a steady-state error that does not depend on rotation of the magnetic field generation source; and an angle computing section that calculates the rotational angle of the magnetic field generation source based on the detection data and the correction values, and outputs an angle signal indicating the rotational angle.

14 Claims, 15 Drawing Sheets

ROTATIONAL ANGLE DETECTION APPARATUS AND ROTATIONAL ANGLE DETECTION METHOD

The contents of the following Japanese patent application(s) are incorporated herein by reference:
No. 2018-077490 filed on Apr. 13, 2018 and
No. 2019-075821 filed on Apr. 11, 2019.

BACKGROUND

1. Technical Field

The present invention relates to a rotational angle detection apparatus, a rotational angle detection method, and a program.

2. Related Art

Conventionally, a magnetic field generating section is provided to a rotating body and a known apparatus detects the rotational angle of the rotating body based on the magnetic field component measured around the rotating body, as shown in Patent Documents 1 and 2, for example.
Patent Document 1: Japanese Patent No. 6191840
Patent Document 2: Japanese Patent Application Publication No. 2006-112862

There are cases where an error occurs in the calculated rotational angle, due to differences between the coordinate system of the rotational angles of the rotating body and the magnetic field generating section and the coordinate system of the rotational angle calculated by the rotational angle detection apparatus.

SUMMARY

In order to solve this problem, according to a first aspect of the present invention, provided is a rotational angle detection apparatus that detects a rotational angle of a magnetic field generation source. The rotational angle detection apparatus may comprise a magnetic field detection apparatus that detects magnetic field components in at least two directions, and outputs resulting detection data. The rotational angle detection apparatus may comprise a correction value calculating section that calculates correction values for correcting an angle error of the rotational angle, based on a steady-state error that does not depend on rotation of the magnetic field generation source. The rotational angle detection apparatus may comprise an angle computing section that calculates the rotational angle of the magnetic field generation source based on the detection data and the correction values, and outputs an angle signal indicating the rotational angle.

The correction value calculating section may calculate the correction values based on the steady-state error and the detection data output by the magnetic field detection apparatus for at least two angle states between which the rotational angle of the magnetic field generation source differs.

The rotational angle detection apparatus may comprise an angle error calculating section that calculates a reference angle error between a detection angle corresponding to the detection data and a reference angle in a first coordinate system in which the magnetic field generation source rotates, for each rotational angle. The correction value calculating section may calculate the correction values based on an average value of the reference angle error in the at least two angle states.

The correction value calculating section may calculate the correction values based on a result obtained by performing a Fourier transform on the reference angle error, using a detection reference angle obtained by adding the average value of the reference angle error to the reference angle.

The correction value calculating section may calculate the average value of the reference angle error based on the detection data in a number of angle states equal to the number of angle states used to perform the Fourier transform on the reference angle error.

The rotational angle detection apparatus may comprise an angle error calculating section that calculates a reference angle error between a detection angle corresponding to the detection data and a reference angle in a first coordinate system, for each rotational angle. The correction value calculating section may calculate the correction values based on a median value of the reference angle error in the at least two angle states.

The rotational angle detection apparatus may comprise a first signal processing section that outputs a first signal corresponding to a magnetic field in a first direction detected by the magnetic field detection apparatus. The rotational angle detection apparatus may comprise a second signal processing section that outputs a second signal corresponding to a magnetic field in a second direction detected by the magnetic field detection apparatus. The rotational angle detection apparatus may comprise a correction processing section that corrects the first signal and the second signal output by the first signal processing section and the second signal processing section, based on the correction values. The angle computing section may calculate the rotational angle based on the correction values and the first signal and the second signal output by the first signal processing section and the second signal processing section. The correction value calculating section may calculate the correction values based on results of a Fourier transform performed on the first signal output by the first signal processing section and the second signal output by the second signal processing section, using a detection reference angle obtained by adding the average value of the reference angle error to the reference angle.

The rotational angle detection apparatus may comprise a correction processing section that corrects the first signal and the second signal output by the first signal processing section and the second signal processing section, based on the correction values. The angle computing section may calculate the rotational angle based on the signals corrected by the correction processing section.

The correction value calculating section may calculate an average value of the reference angle error based on the detection data in a number of angle states equal to the number of angle states used to perform the Fourier transform on the first signal output by the first signal processing section and the second signal output by the second signal processing section.

The correction value calculating section may calculate the correction values based on results of the Fourier transform performed on the first signal output by the first signal processing section and the second signal output by the second signal processing section using a reference angle in the first coordinate system.

The rotational angle detection apparatus may comprise a correction processing section that corrects the first signal and the second signal output by the first signal processing section and the second signal processing section, based on the correction values. The angle computing section may calculate the rotational angle based on the signals corrected by the correction processing section.

According to a second aspect of the present invention, provided is a rotational angle detection method for detecting a rotational angle of a magnetic field generation source based on magnetic fields detected by a magnetic field detection apparatus that detects magnetic fields in at least two directions. The angle detection method may comprise calculating correction values for correcting an angle error of the rotational angle, based on a steady-state error that does not depend on rotation of the magnetic field generation source. The angle detection method may comprise calculating the rotational angle of the magnetic field generation source based on detection data of the magnetic field detection apparatus and the correction values, and outputting an angle signal indicating the rotational angle.

According to a third aspect of the present invention, provided is a rotational angle detection apparatus. The rotational angle detection apparatus may comprise a data acquiring section that acquires detection data in the magnetic field detection apparatus, in at least two angle states between which the rotational angle of the magnetic field generation source differs. The rotational angle detection apparatus may comprise a correction value calculating section that calculates correction values for correcting an angle error of the rotational angle corresponding to a difference between a first coordinate system in which the magnetic field generation source rotates and a second coordinate system of the magnetic field detection apparatus, based on the detection data in the at least two angle states and a steady-state error of the rotational angle corresponding to the difference between the first coordinate system and the second coordinate system.

According to a fourth aspect of the present invention, provided is a program that causes a computer to perform the angle detection method according to the second aspect.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
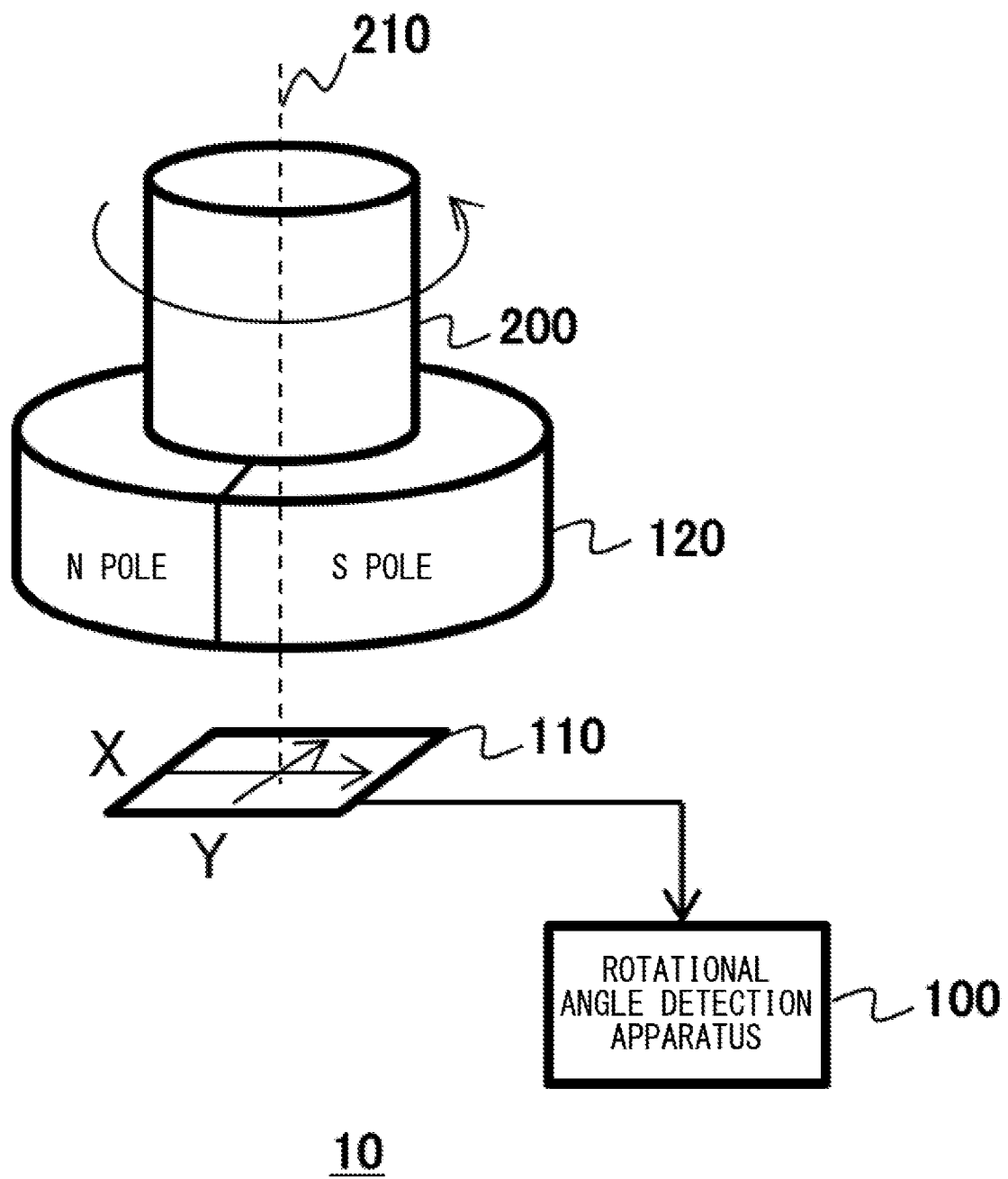
FIG. 1 shows an example of a system 10 that detects a rotational angle of a rotating body 200.

FIG. 1 shows an example of a system 10 that detects a rotational angle of a rotating body 200. The rotating body 200 rotates centered on a prescribed rotational axis 210. In FIG. 1, the rotating body 200 is shaped as a rod, but the shape of the rotating body 200 is not limited to the example of FIG. 1.

The system 10 includes a magnetic field generation source 120, a magnetic field detection apparatus 110, and a rotational angle detection apparatus 100. The magnetic field generation source 120 is secured to the rotating body 200. The magnetic field generation source 120 rotates along with the rotation of the rotating body 200. The magnetic field generation source 120 of the present example rotates centered on the rotational axis 210. The magnetic field generation source 120 may be a magnet including an S pole and an N pole. The S pole and the N pole may be arranged along a plane perpendicular to the rotational axis 210.

The magnetic field detection apparatus 110 detects the magnetic field generated by the magnetic field generation source 120. The magnetic field detection apparatus 110 detects magnetic field components in at least two directions, at the position where the magnetic field detection apparatus 110 is provided. The magnetic field detection apparatus 110 may detect the magnetic field components in at least two directions, and output detection data indicating these magnetic field components. The magnetic field detection apparatus 110 of the present example detects the magnetic field components in two directions that are an X-axis direction and a Y-axis direction orthogonal to each other in a plane perpendicular to the rotational axis 210. The X-axis direction is an example of a first direction, and the Y-axis direction is an example of a second direction. In the example of FIG. 1, the magnetic field detection apparatus 110 is arranged directly below the magnetic field generation source 120 (i.e. at a position opposite the magnetic field generation source 120 in a direction parallel to the rotational axis 210), but the position of the magnetic field generation source 120 is not limited to this. The magnetic field detection apparatus 110 may be arranged at a position where the magnetic field components in the two directions fluctuate according to the rotational angle of the magnetic field generation source 120.

The magnetic field detection apparatus 110 may convert each detected magnetic field component into an electrical signal. The magnetic field detection apparatus 110 includes a Hall element or magnetic resistance element, for example, but the means for detecting the magnetic field components is not limited to this.

The rotational angle detection apparatus 100 detects the rotational angle of the magnetic field generation source 120 based on the magnetic field components detected by the magnetic field detection apparatus 110. The rotational angle detection apparatus 100 includes a signal processing section that processes the electrical signals. The rotational angle detection apparatus 100 may be a general-purpose apparatus such as a computer, or may be a specialized apparatus for detecting a rotational angle. Some or all of the configurations in the rotational angle detection apparatus 100 may be provided integrally with the magnetic field detection apparatus 110, or may be provided separately from the magnetic field detection apparatus 110. Some or all of the configurations in the rotational angle detection apparatus 100 may be formed on a semiconductor substrate common to the magnetic field detection apparatus 110.

The magnetic field components $Vx(\theta')$ and $Vy(\theta')$ respectively in the X-axis direction and the Y-axis direction detected by the magnetic field detection apparatus 110 can be expressed as shown in the expressions below.

$$Vx(\theta')=(1+\alpha)\cos(\theta'+\beta)-Ox \quad (1)$$

$$Vy(\theta')=(1-\alpha)\sin(\theta'-\beta)+Oy \quad (2)$$

$$\theta'=\theta+\Delta\theta z \quad (3)$$

Here, $\theta$ is a reference angle of the rotational angle of the magnetic field generation source 120. A case where the reference angle is recorded as $\theta(i)$ indicates the i-th angle in a case where an angle of 360 degrees around the magnetic field generation source 120 in a first coordinate system is divided into N equal portions. N is an integer greater than or equal to 2, and i is an integer from 0 to N−1. $\theta'$ is the reference angle used by the rotational angle detection apparatus 100 to detect the rotational angle of the magnetic field generation source 120. In the present specification, $\theta'$ is referred to as the detection reference angle. A case where the detection reference angle is recorded as $\theta'(i)$ indicates the i-th detection reference angle in a case where a 360-degree angle of one rotation in the second coordinate system is divided into N equal portions. $\Delta\theta z$ indicates a steady-state error between the reference angle $\theta$ and the detection reference angle $\theta'$ caused by the coordinate systems being different. Ox and Oy indicate the offset errors of the magnetic field components detected by the magnetic field detection apparatus 110. $\alpha$ indicates an amplitude error of the magnetic field components detected by the magnetic field detection apparatus 110, and $-1<\alpha<1$. $\beta$ indicates a phase error of the magnetic field components detected by the magnetic field detection apparatus 110, and $-\pi<\beta<+\pi$. Each error may include not only the errors in the magnetic field components detected by the magnetic field detection apparatus 110, but also errors occurring in the magnetic field detection apparatus 110 itself.

By calculating the arc tangent of the magnetic field components $Vx(\theta')$ and $Vy(\theta')$ shown in Expression 1 and Expression 2, the rotational angle detection apparatus 100 can detect the rotational angle of the magnetic field generation source 120 before correction. In the present specification, the rotational angle before correction is referred to as the uncorrected detection angle $\varphi$. The angle error $\Delta\theta'$ of the uncorrected detection angle $\varphi$ relative to the detection reference angle $\theta'$ can be expressed as shown in the expression below.

$$\Delta\theta'=-Ox \sin 1'+Oy \cos 1''-\alpha \sin 2\theta'-\beta \cos 2\theta' \quad (4)$$

The rotational angle detection apparatus 100 calculates correction values for correcting each error component Ox, Oy, $\alpha$, and $\beta$, and detects the rotational angle using these correction values. In the present specification, the rotational angle after the correction is referred to as the corrected detection angle $\varphi_o$. The rotational angle detection apparatus 100 of the present invention further reduces the angle error $\Delta\theta'$ by calculating correction values that take into consideration the difference between the coordinate systems of the magnetic field generation source 120 and the rotational angle detection apparatus 100.

Comparative Example

Figure 2:
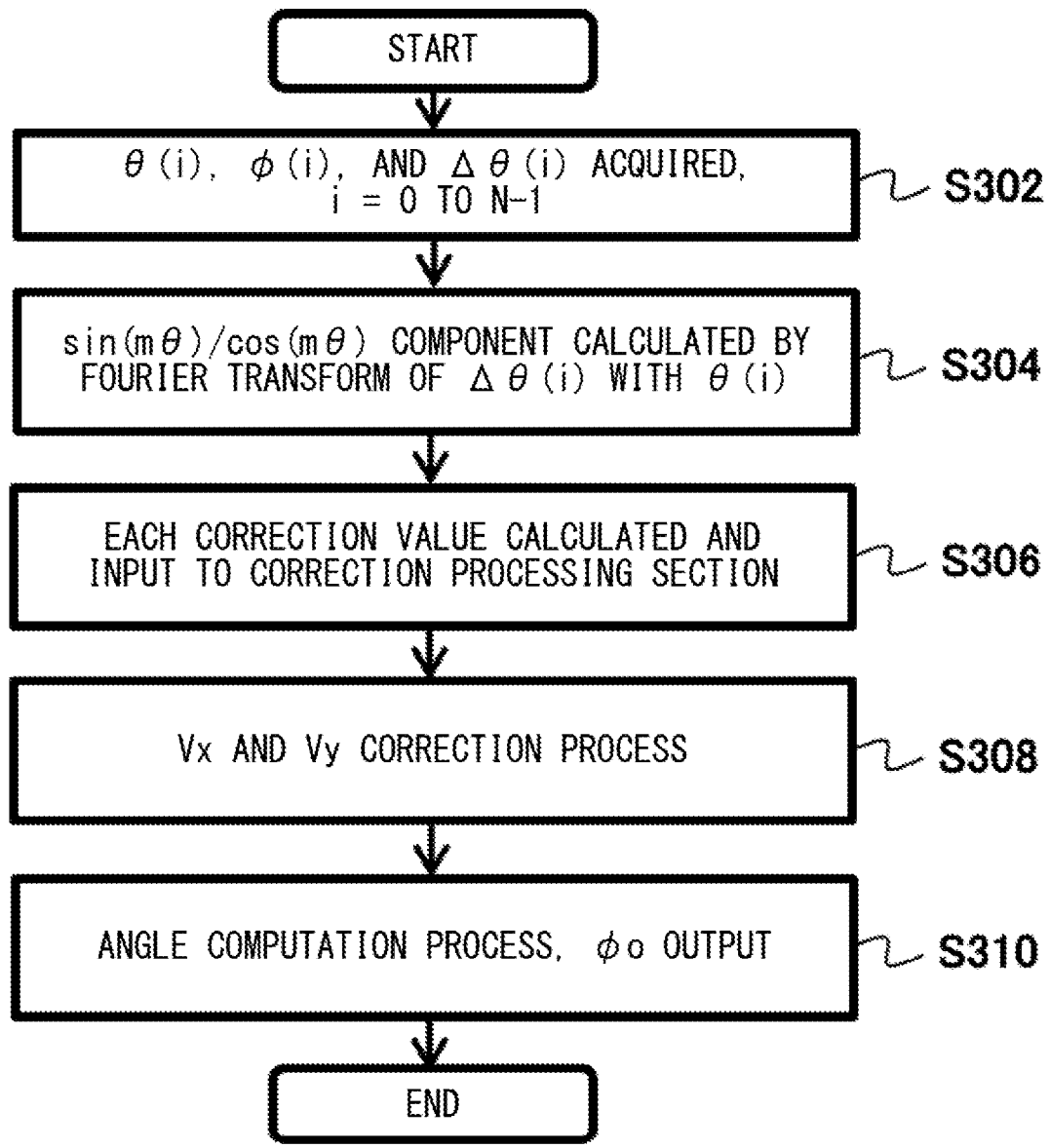
FIG. 2 is a flow chart showing an example of a rotational angle detection method according to a comparative example.

FIG. 2 is a flow chart showing an example of a rotational angle detection method according to a comparative example. In the rotational angle detection method of the comparative example, a process for calculating a correction value for correcting an angle error is performed (S302 to S306), and then the rotational angle to be calculated is corrected (S308 to S310).

First, for each value of i, the reference angle $\theta(i)$, the uncorrected detection angle $\varphi(i)$, and the reference angle error $\Delta\theta(i)$ are acquired (S302). The reference angle (i) is provided by the expression shown below.

$$\theta(i) = \theta(0) + \frac{360}{N}i \quad (5)$$

$\theta(0)$ is the initial value of the reference angle $\theta(i)$, and may be any constant. In the present example, the uncorrected detection angle $\varphi(0)$ at the time when i=0 is used as $\theta(0)$. N is an integer greater than or equal to 2, and i is an integer from 0 to N−1. The reference angle $\theta(i)$ indicates the i-th angle in a case where an angle of 360 degrees around the magnetic field generation source 120 is divided into N equal portions.

When the rotating body 200 rotates with a prescribed power, the magnetic field components change periodically. The angle state at each timing obtained by dividing the period of the magnetic field components into N equal portions may be the i-th angle state. The uncorrected detection angle $\varphi(i)$ can be calculated from the arc tangent of the magnetic field components $Vx(\theta')$ and $Vy(\theta')$ at the time when the reference angle is $\theta(i)$.

The reference angle error $\Delta\theta(i)$ is the difference between the reference angle $\theta(i)$ and the uncorrected detection angle $\varphi(i)$, and is provided by the expression shown below.

$$\Delta\theta(i)=\theta(i)-\varphi(i) \quad (6)$$

Furthermore, an example of the correspondence between the reference angle error $\Delta\theta(i)$, the reference angle $\theta(i)$, and the uncorrected detection angle $\varphi(i)$ is shown in Table 1.

TABLE 1

| i | θ(i) | φ(i) | Δθ(i) |
|---|------|------|-------|
| 0 | φ(0) | φ(0) | 0 |
| 1 | φ(0) + 1 × 360/N | φ(1) | φ(1) − θ(1) |
| 2 | φ(0) + 2 × 360/N | φ(2) | φ(2) − θ(2) |
| ... | ... | ... | ... |
| ... | ... | ... | ... |
| ... | ... | ... | ... |
| N − 2 | φ(0) + (N − 2) × 360/N | φ(N − 2) | φ(N − 2) − θ(N − 2) |
| N − 1 | φ(0) + (N − 1) × 360/N | φ(N − 1) | φ(N − 1) − θ(N − 1) |

Next, Δθ(θ) is calculated by performing a Fourier transform on the reference angle error Δθ(i) using the reference angle θ(i) (S304). Δθ(θ) is provided by tire expression shown below.

$$\Delta\theta(\theta) = \Delta\theta z + A_1 \sin 1\theta + B_1 \cos 1\theta + A_2 \sin 2\theta + B_2 \cos 2\theta \quad (7)$$

In the comparative example, $A_1$, $B_1$, $A_2$, and $B_2$ shown in Expression 7 are calculated as the correction values (S306). The magnetic field components Vx and Vy are corrected based on these correction values (S308), and the detection angle % is calculated from the arc tangent of the corrected magnetic field components (S310).

However, as shown in Expression 4, the angle error Δθ' detected by tire rotational angle detection apparatus 100 is determined according to the detection reference angle θ'. Therefore, in a case where the reference angle θ and the detection reference angle θ' do not match due to differing coordinate systems, the angle error Δθ shown in Expression 7 and the angle error Δθ' shown in Expression 4 do not match precisely. Accordingly, when the detection angle is corrected using the correction values calculated based on Expression 7, an error corresponding to the difference between the coordinate systems (i.e. the difference between the reference angle θ and the detection reference angle θ') is included.

The rotational angle detection apparatus 100 according to the embodiment example calculates the correction values based on a steady-state error of the rotational angle corresponding to the difference between the first coordinate system of the magnetic field generation source 120 and the second coordinate system of the rotational angle detection apparatus 100. In this way, the angle error Δθ' is accurately corrected.

First Embodiment Example

Figure 3:
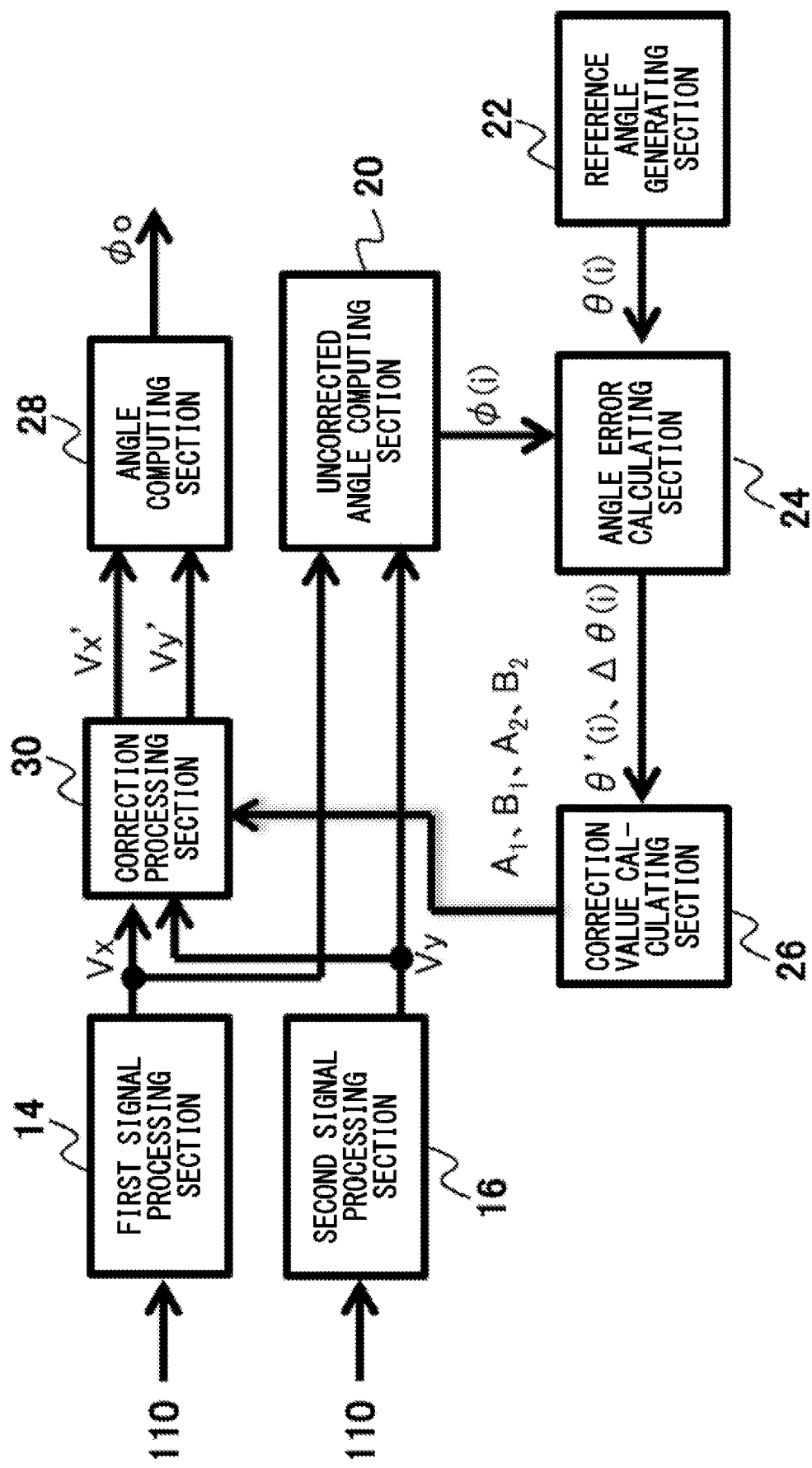
FIG. 3 is a block diagram showing an example of a configuration of the rotational angle detection apparatus 100 according to a first embodiment example of the present invention.

FIG. 3 is a block diagram showing an example of a configuration of the rotational angle detection apparatus 100 according to a first embodiment example of the present invention. The rotational angle detection apparatus 100 detects the rotational angle of the magnetic field generation source 120 based on the magnetic field components detected by the magnetic field detection apparatus 110. The rotational angle detection apparatus 100 of the present example includes a first signal processing section 14, a second signal processing section 16, a correction processing section 30, an angle computing section 28, an uncorrected angle computing section 20, a reference angle generating section 22, an angle error calculating section 24, and a correction value calculating section 26.

The first signal processing section 14 and the second signal processing section 16 function as data acquiring sections that acquire the detection data of the magnetic field detection apparatus 110 in at least two angle states (i) where the rotational angle of the magnetic field generation source 120 is different. The first signal processing section 14 acquires an electrical signal (first signal) indicating the magnetic field component Vx, as the detection data. The second signal processing section 16 acquires an electrical signal (second signal) indicating the magnetic field component Vy, as the detection data. The first signal processing section 14 and the second signal processing section 16 acquire the magnetic field components in at least two angle states. The first signal processing section 14 and the second signal processing section 16 of the present example acquire the magnetic field components in N angle states. The first signal processing section 14 and the second signal processing section 16 may acquire the magnetic field components in each angle state by sampling the electrical signals indicating the magnetic field components at prescribed timings.

Furthermore, the first signal processing section 14 and the second signal processing section 16 may perform a prescribed process on the magnetic field components Vx and Vy, and output the processed magnetic field components Vx and Vy. For example, the first signal processing section 14 and the second signal processing section 16 may amplify the signal levels of the input magnetic field components Vx and Vy, or perform a prescribed filtering process on the magnetic field components Vx and Vy.

Figure 4:
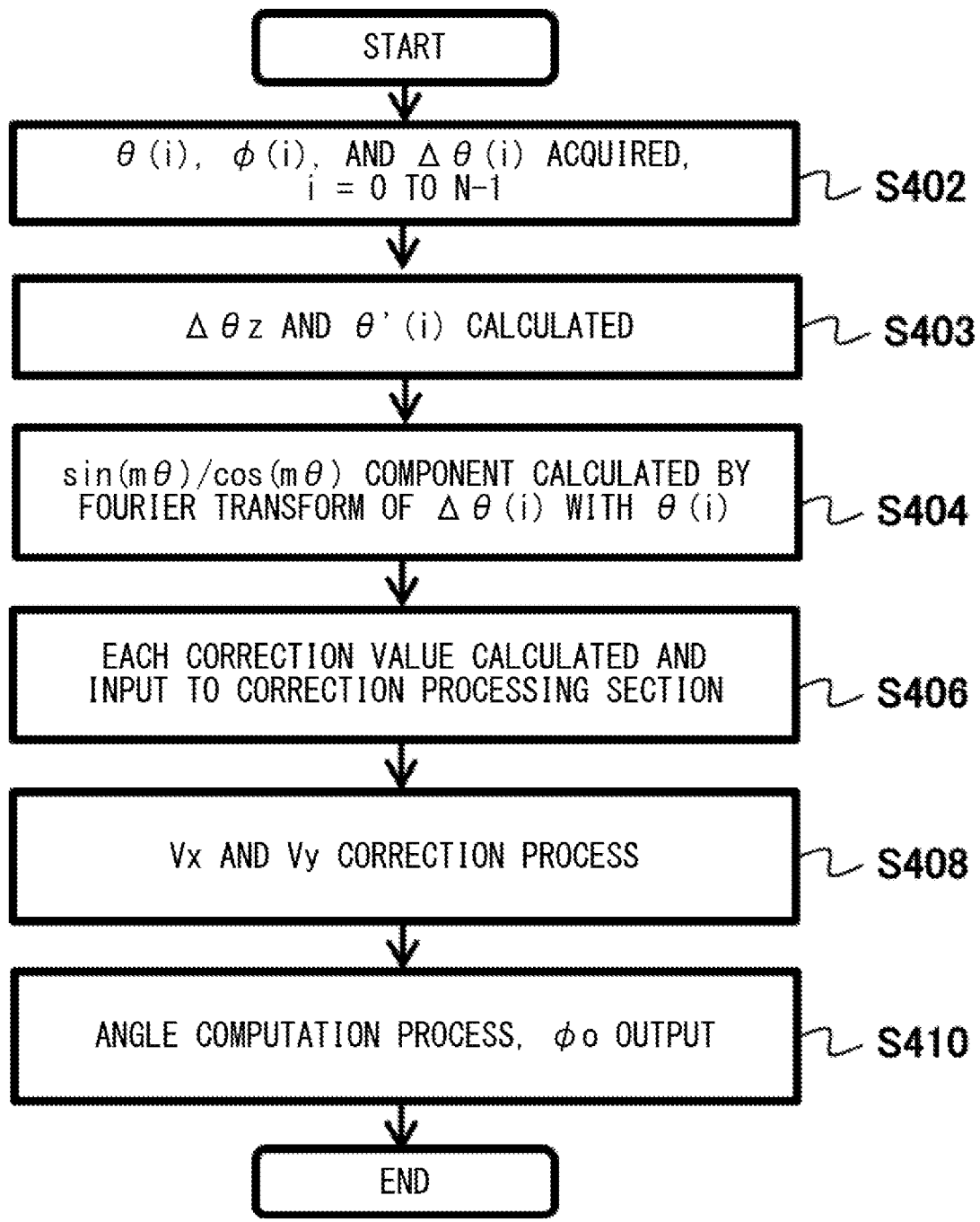
FIG. 4 is a flow chart showing an operational example of the rotational angle detection apparatus 100 shown in FIG. 3.

FIG. 4 is a flow chart showing an operational example of the rotational angle detection apparatus 100 shown in FIG. 3. The reference angle generating section 22 generates the reference angle θ(i) using the same method as in S302 of the comparative example (S402). Furthermore, the uncorrected angle computing section 20 generates the uncorrected detection angle φ(i) using the same method as in S302 of the comparative example (S402). The angle error calculating section 24 generates the reference angle error Δθ(i) using the same method as in S302 of the comparative example (S402). The angle error calculating section 24 calculates the reference angle error Δθ(i) between the uncorrected detection angle φ corresponding to the magnetic field component and the reference angle θ(i) in the first coordinate system, for each angle state (i).

Next, the angle error calculating section 24 calculates the steady-state error Δθz and the detection reference angle θ'(i) (S403). The steady-state error Δθz is an error component that does not depend on the rotation of the magnetic field generation source 120. In other words, the steady-state error Δθz is an error component that is included in a steady-state manner, regardless of the rotational angle, in the error between the reference angle θ(i) and the detection reference angle θ'(i). The angle error calculating section 24 of the present example calculates the steady-state error Δθz based on the average value of the reference angle error Δθ(i) in at least two angle states (i.e. for at least two values of i). The angle error calculating section 24 may calculate the steady-state error Δθz based on the average value of the reference angle error Δθ(i) in at least four angle states, calculate the steady-state error Δθz based on the average value of the reference angle error Δθ(i) in N angle states, calculate the steady-state error Δθz based on the average value of the reference angle error Δθ(i) in more than N angle states, or calculate the steady-state error Δθz based on the average value of the reference angle error Δθ(i) in less than N angle states. It should be noted that N is equal to the number of angle states used to perform the Fourier transform described further below. The angle error calculating section 24 of the present example calculates the steady-state error $\Delta\theta z$ based on the expression shown below.

$$\Delta\theta z = \frac{\sum_{i=0}^{N-1} \Delta\theta(i)}{N} \qquad (8)$$

Furthermore, the angle error calculating section 24 of the present example may calculate the steady-state error based on a median value of the reference angle error $\Delta\theta(i)$ in at least two angle states (i.e. for at least two values of i). The angle error calculating section 24 may calculate the steady-state error based on a median value of the reference angle error $\Delta\theta(i)$ in at least four angle states, calculate the steady-state error based on a median value of the reference angle error $\Delta\theta(i)$ at N angle states, calculate the steady-state error based on a median value of the reference angle error $\Delta\theta(i)$ in more than N angle states, or calculate the steady-state error based on a median value of the reference angle error $\Delta\theta(i)$ in less than N angle states. The median value of the reference angle error $\Delta\theta(i)$ is the value of the reference angle error $\Delta\theta(i)$ positioned in the center when a plurality of reference angle errors $\Delta\theta(i)$ are sorted in ascending (or descending) order. It should be noted that in a case where there are an odd number of reference angle errors $\Delta\theta(i)$, the median value is the average value of the two reference angle errors $\Delta\theta(i)$ at the center. The angle error calculating section 24 of the present example calculates the steady-state error $\Delta\theta z$ based on the expression shown below. Here, the reference angle errors $\Delta\theta(i)$ are assumed to be sorted in ascending order. Furthermore, K indicates the number of sorted reference angle errors $\Delta\theta(i)$.

$$\Delta\theta z = \begin{cases} \Delta\theta(m), & m = \frac{K+1}{2} \quad (\text{if } K = \text{odd}) \\ \frac{\Delta\theta(m) + \Delta\theta(m+1)}{2}, & m = \frac{K}{2} \quad (\text{if } K = \text{even}) \end{cases}$$

The detection reference angle $\theta'(i)$ is provided by the expression shown below.

$$\theta'(i) = \theta(i) + \Delta\theta z \qquad (9)$$

An example of the correspondence between the reference angle error $\Delta\theta(i)$, the reference angle $\theta(i)$, the uncorrected detection angle $\varphi(i)$, and the detection reference angle $\theta'(i)$ is shown in Table 2.

TABLE 2

| i | $\theta(i)$ | $\varphi(i)$ | $\Delta\theta(i)$ | $\theta'(i)$ |
|---|---|---|---|---|
| 0 | $\varphi(0)$ | $\varphi(0)$ | 0 | $\theta(1) + \Delta\theta z$ |
| 1 | $\varphi(0) + 1 \times 360/N$ | $\varphi(1)$ | $\varphi(1) - \theta(1)$ | $\theta(2) + \Delta\theta z$ |
| 2 | $\varphi(0) + 2 \times 360/N$ | $\varphi(2)$ | $\varphi(2) - \theta(2)$ | $\theta(3) + \Delta\theta z$ |
| ... | ... | ... | ... | ... |
| ... | ... | ... | ... | ... |
| ... | ... | ... | ... | ... |
| N − 2 | $\varphi(0) + (N-2) \times 360/N$ | $\varphi(N-2)$ | $\varphi(N-2) - \theta(N-2)$ | $\theta(N-2) + \Delta\theta z$ |
| N − 1 | $\varphi(0) + (N-1) \times 360/N$ | $\varphi(N-1)$ | $\varphi(N-1) - \theta(N-1)$ | $\theta(N-1) + \Delta\theta z$ |

Next, the correction value calculating section 26 calculates the angle error component $\Delta\theta(\theta')$ obtained by performing a Fourier transform on the reference angle error $\Delta\theta(i)$ with the detection reference angle $\theta'(i)$ (S404). The correction value calculating section 26 may calculate components of the second order and lower as shown in the expression below.

$$\Delta\theta(\theta') = \Delta\theta z + A_1 \sin 1\theta' + B_1 \cos 1\theta' + A_2 \sin 2\theta' + B_2 \cos 2\theta' \qquad (10)$$

The correction value calculating section 26 calculates each correction value based on the amplitude values $A_1$, $B_1$, $A_2$, and $B_2$ of the respective components of the angle error component $\Delta\theta(\theta')$ (S406). The correction value calculating section 26 may use the amplitude values $A_1$, $B_1$, $A_2$, and $B_2$ as the correction values, or may use values obtained by applying a prescribed process to the amplitude values $A_1$, $B_1$, $A_2$, and $B_2$ as the correction values. Each amplitude value corresponds to an error component shown in Expression 1 and Expression 2, as shown below. Therefore, it is possible to calculate the correction value corresponding to each error component.

$$A_1 = -Ox$$

$$B_1 = +Oy$$

$$A_2 = -\alpha$$

$$B_2 = -\beta$$

The correction value calculating section 26 calculates the correction values for correcting the angle error of the rotational angle. The correction value calculating section 26 may calculate these correction values based on the steady-state error, which does not depend on the rotation of the magnetic field generation source 120. The correction value calculating section 26 may calculate these correction values further based on the detection data output by the magnetic field detection apparatus 110 in at least two angle states between which the rotational angle of the magnetic field generation source 120 differs. The correction value calculating section 26 of the present example calculates the correction values for correcting the angle error of the rotational angle corresponding to the difference between the first coordinate system corresponding to the reference angle $\theta$ and the second coordinate system of the magnetic field detection apparatus 110 corresponding to the detection reference angle $\theta'$, based on the magnetic field components Vx and Vy and the steady-state error $\Delta\theta z$ of the rotational angle corresponding to the difference between the first coordinate system and the second coordinate system. The correction value calculating section 26 may store the calculated correction values, and use the stored correction values for correcting the following angle computations. The correction value calculating section 26 may recalculate and update the correction values at prescribed timings.

Next, the correction processing section 30 corrects the magnetic field components Vx and Vy output by the first signal processing section 14 and the second signal processing section 16, using the correction values output by the correction value calculating section 26 (S408). As an example, the correction processing section 30 sequentially performs correction of the offset errors (Ox and Oy), correction of the amplitude error ($\alpha$), and correction of the phase error ($\beta$) in the stated order.

The correction processing section 30 may correct the offset errors based on the expressions shown below.

$$Vx1'(\theta') = Vx(\theta') + A_1 = (1+\alpha)\cos(\theta'+\beta) \qquad (11)$$

$$Vy1'(\theta') = Vy(\theta') + B_1 = (1-\alpha)\sin(\theta'+\beta) \qquad (12)$$

The correction processing section 30 may correct the amplitude error based on the expressions shown below.

$$Vx2'(\theta') = \frac{Vx1(\theta')}{1-A_2} = \cos(\theta' + \beta) \quad (13)$$

$$Vy2'(\theta') = \frac{Vy1(\theta')}{1+A_2} = \sin(\theta' - \beta) \quad (14)$$

The correction processing section 30 may correct the phase error based on the expressions shown below.

$$Vx'(\theta)Vx2'(\theta')-B_2 \cdot Vy2'(\theta' \cong \cos(\theta') \quad (15)$$

$$Vy'(\theta')Vy2'(\theta')-B_2 \cdot Vx2'(\theta' \cong \sin(\theta') \quad (16)$$

In the phase correction, $B_2 \ll 1$ is approximated by $\cos(B_2) \approx 1$ and $\sin(B_2) \cong 1$.

Next, the angle computing section 28 performs the angle computation process based on the corrected magnetic field components Vx' and Vy', and outputs the corrected detection angle φo (S410). The angle computing section 28 may calculate the corrected detection angle φo based on the arc tangent of Vx' and Vy', as shown in the expression below.

$$\phi o = \tan^{-1}\frac{Vy'(\theta')}{Vx'(\theta')} = \theta' = \theta + \Delta\theta z \quad (17)$$

In this way, it is possible to obtain the corrected detection angle φo in which the angle error has been reduced. The corrected reference angle error Δθo is shown by the expression below.

$$\Delta\theta o = \phi o - \theta = \Delta\theta z \quad (18)$$

The steady-state error Δθz component remains as the reference angle error Δθo, but it is possible to make the peak-to-peak value of Δθo small. Therefore, it is possible to improve the linearity of the corrected detection angle φo output by the rotational angle detection apparatus 100.

Figure 5:
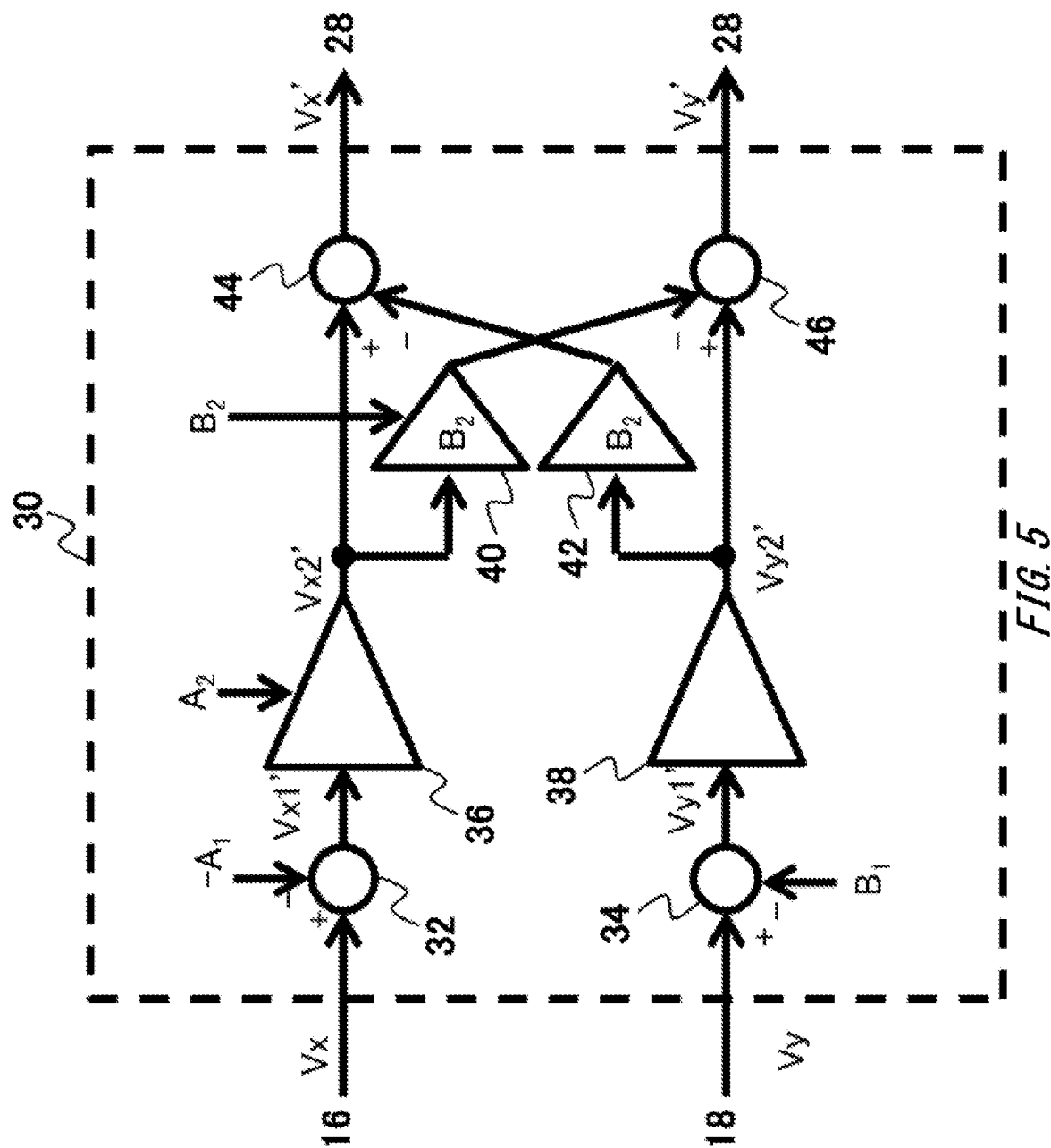
FIG. 5 is a block diagram showing an example of a configuration of the correction processing section 30.

FIG. 5 is a block diagram showing an example of a configuration of the correction processing section 30. The correction processing section 30 includes difference output sections 32, 34, 44, and 46 and multiplying sections 36, 38, 40, and 42. The difference output sections 32 and 34 function as offset correcting sections that correct the offset errors. As shown in Expression 11, the difference output section 32 outputs a magnetic field component Vx1' obtained by subtracting the correction value $-A_1$ from the magnetic field component Vx. As shown in Expression 12, the difference output section 34 outputs a magnetic field component Vy1' obtained by subtracting the correction value $B_1$ from the magnetic field component Vy.

The multiplying sections 36 and 38 function as amplitude correcting sections that correct the amplitude errors. As shown in Expression 13, the multiplying section 36 outputs a magnetic field component Vx2' obtained by multiplying the magnetic field component Vx1' by $1/(1-A_2)$. As shown in Expression 14, the multiplying section 38 outputs a magnetic field component Vx2' obtained by multiplying the magnetic field component Vy1' by $1/(1+A_2)$.

The multiplying sections 40 and 42 and the difference output sections 44 and 46 function as phase correcting sections that correct the phase errors. As shown in Expression 15, the multiplying section 42 outputs the product of the magnetic field component Vy2' and the correction value $B_2$, and the difference output section 44 subtracts the output of the multiplying section 42 from the magnetic field component Vx2'. As shown in Expression 16, the multiplying section 40 outputs the product of the magnetic field component Vx2' and the correction value $B_2$, and the difference output section 46 subtracts output of the multiplying section 40 from the magnetic field component Vy2'. According to the process described above, it is possible to calculate the corrected magnetic field components Vx' and Vy'.

Figure 6:
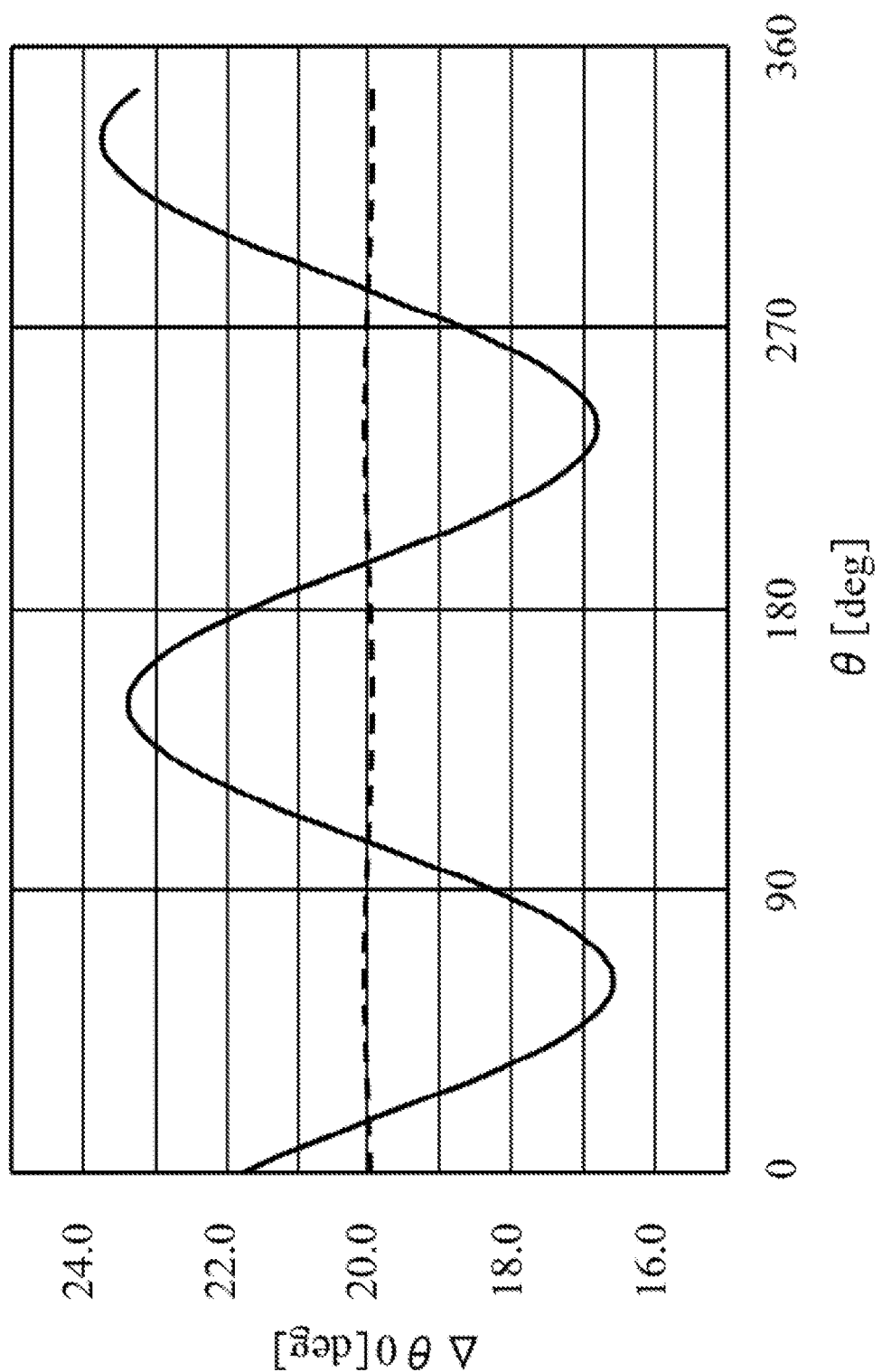
FIG. 6 shows the angle error $\Delta\theta_0$ in the comparative example shown in FIG. 2 and the angle error $\Delta\theta_0$ in the first embodiment example shown in FIGS. 3 to 5.

FIG. 6 shows the angle error $\Delta\theta_0$ in the comparative example shown in FIG. 2 and the angle error $\Delta\theta_0$ in the first embodiment example shown in FIGS. 3 to 5. In FIG. 6, the waveform shown by a solid line indicates the comparative example, and the waveform shown by a dashed line indicates the first embodiment example. In FIG. 6, Ox=0.02, Oy=−0.01, α=0.2, β=2 (deg), and Δθz=20 (deg).

In the comparative example, the peak-to-peak value of the angle error $\Delta\theta_0$ was 7.1 degrees. In contrast to this, the peak-to-peak value of the angle error $\Delta\theta_0$ in the first embodiment example was 0.2 degrees. As shown in FIG. 6, the linearity of the detection angle φo in the first embodiment example is improved.

Second Embodiment Example

Figure 7:
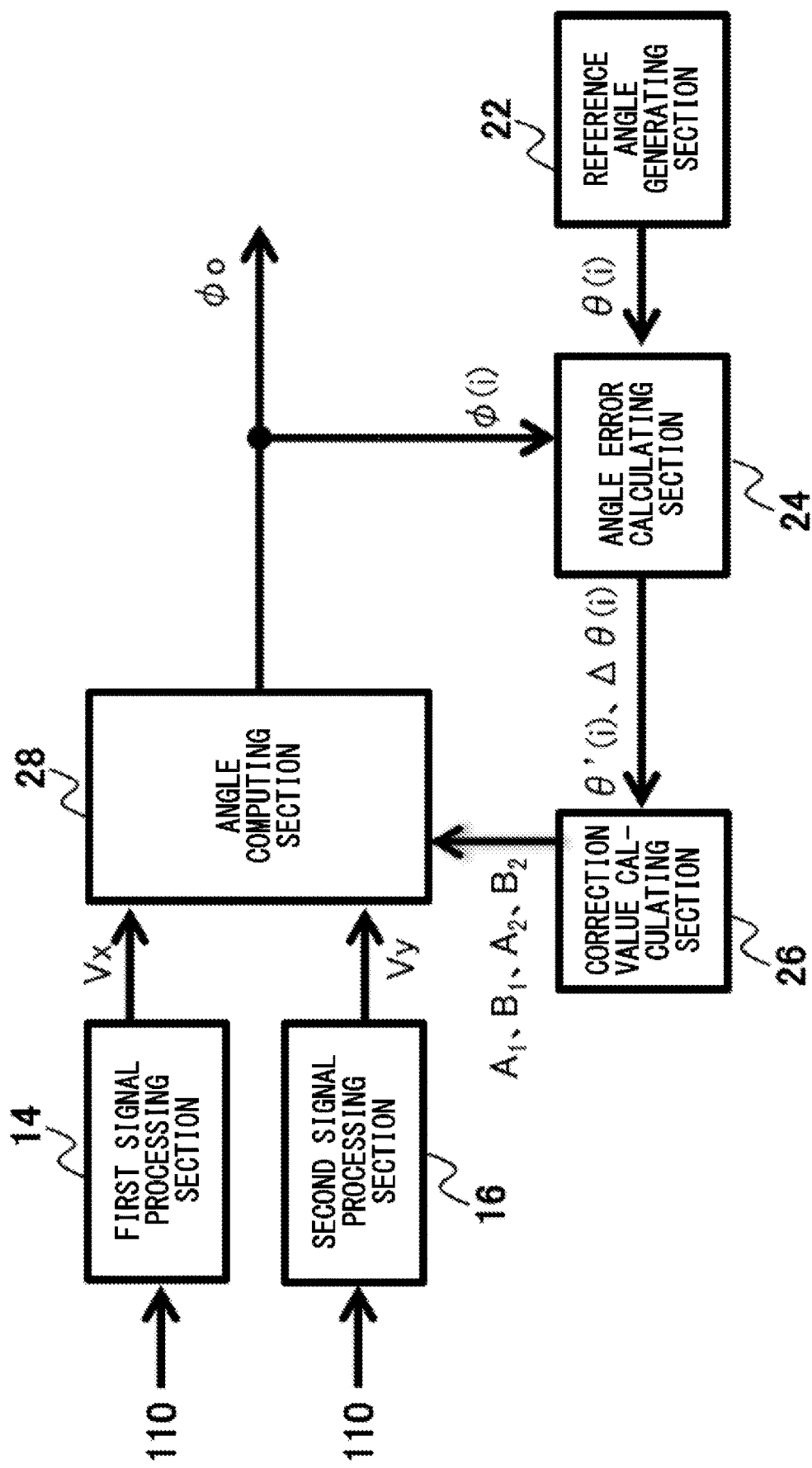
FIG. 7 is a block diagram showing an example of a configuration of the rotational angle detection apparatus 100 according to a second embodiment example of the present invention.

FIG. 7 is a block diagram showing an example of a configuration of the rotational angle detection apparatus 100 according to a second embodiment example of the present invention. The rotational angle detection apparatus 100 of the present example does not include the correction processing section 30 and the uncorrected angle computing section 20, in contrast to the rotational angle detection apparatus 100 shown in FIG. 3. The angle computing section 28 of the present example may include the functions of the correction processing section 30 and the uncorrected angle computing section 20 shown in FIG. 3.

Figure 8:
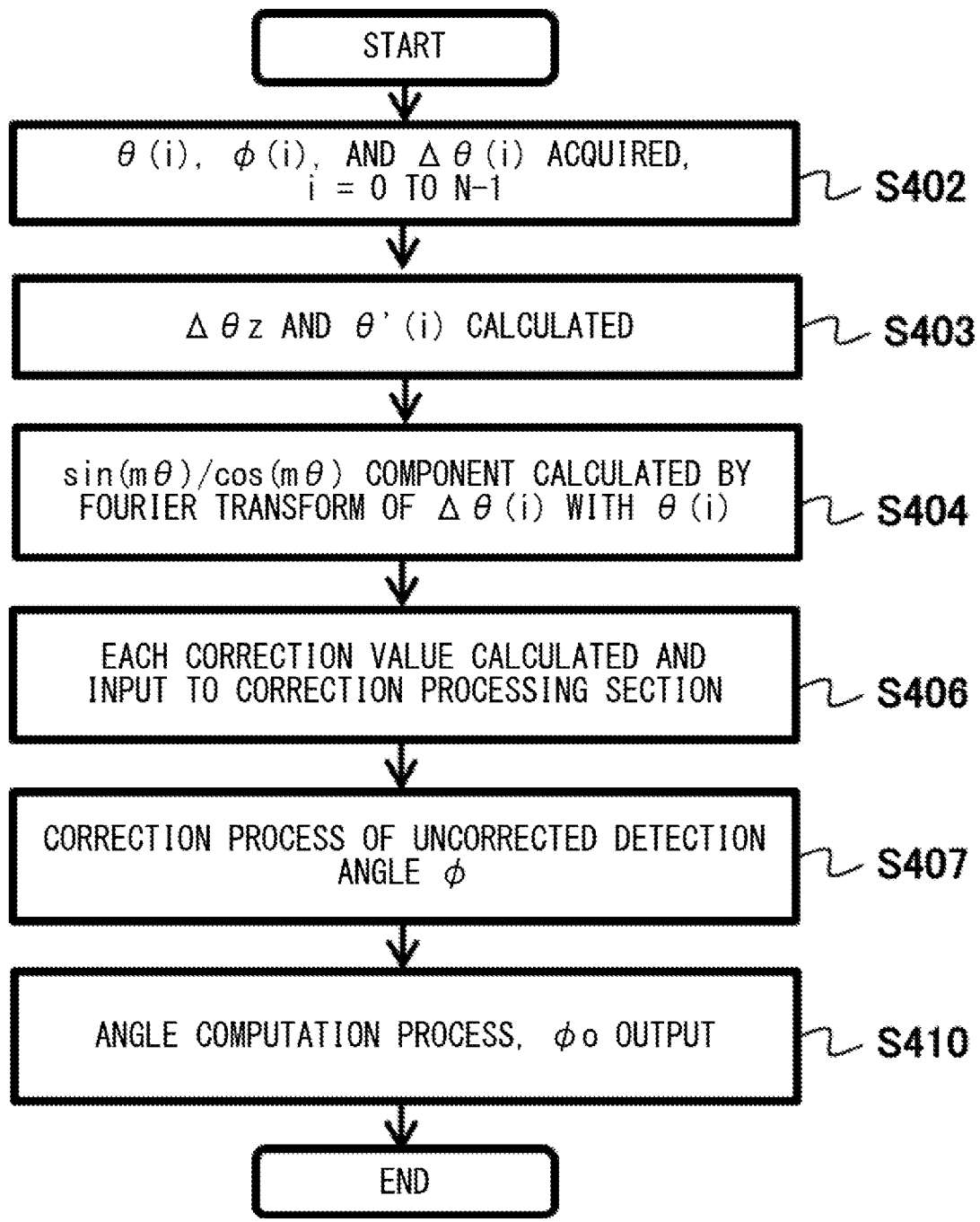
FIG. 8 is a flow chart showing an example of the operation of the rotational angle detection apparatus 100 shown in FIG. 7.

FIG. 8 is a flow chart showing an example of the operation of the rotational angle detection apparatus 100 shown in FIG. 7. The processes from S402 to S406 for outputting the correction values are similar to the processes from S402 to S406 shown in FIG. 4. However, in S406 of the present example, the correction values are output to the angle computing section 28. Next, the angle computing section 28 outputs the corrected detection angle φo based on the magnetic field components Vx and Vy and the correction values calculated by the correction value calculating section 26 (S410). The angle computing section 28 may calculate the rotational angle of the magnetic field generation source based on the detection data of the magnetic field components detected by the magnetic field detection apparatus 110 and the correction values calculated by the correction value calculating section 26. The angle computing section 28 may output an angle signal indicating the corrected detection angle φo of the magnetic field generation source 120.

Figure 9:
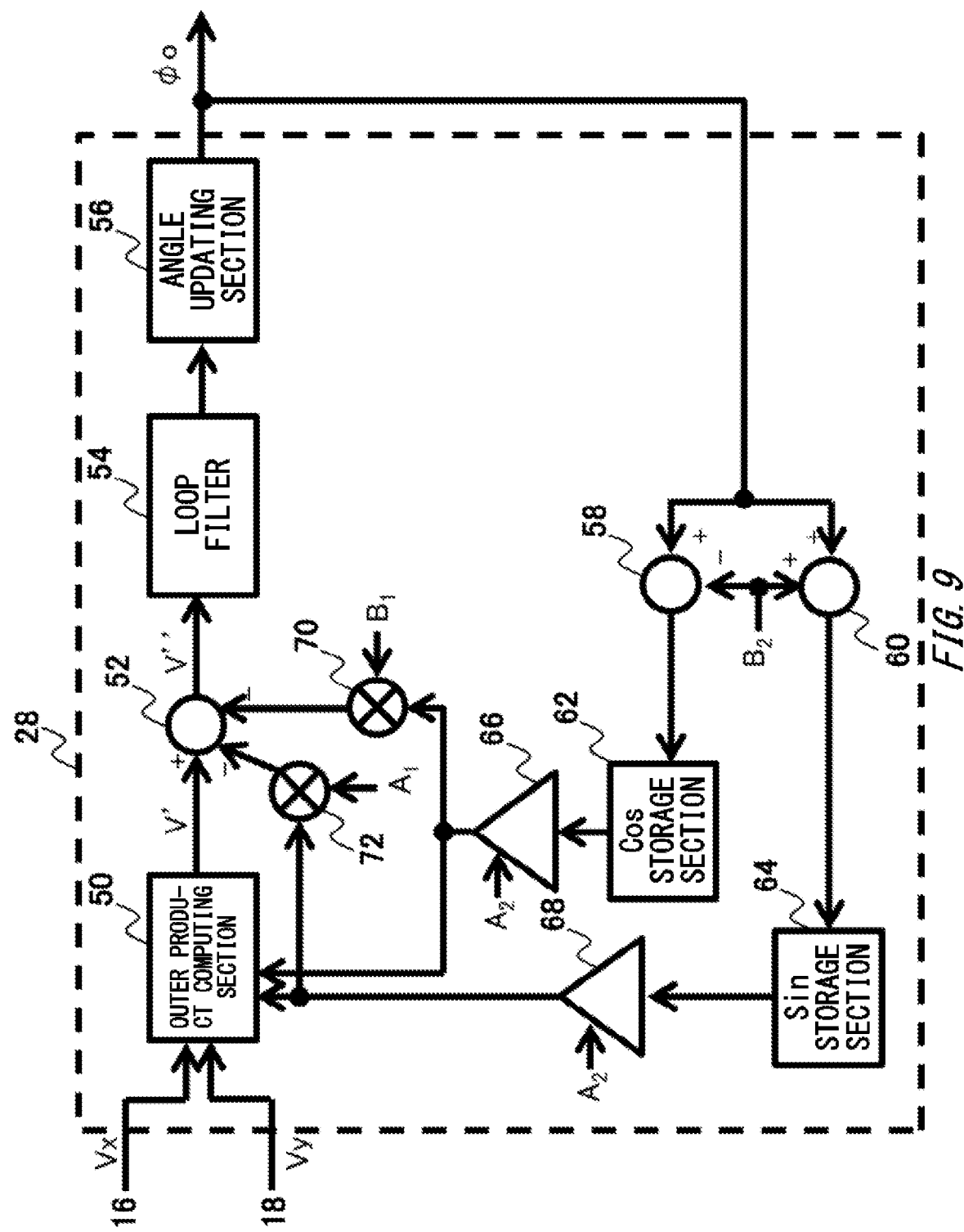
FIG. 9 shows an example of a configuration for calculating the corrected detection angle φo in the angle computing section 28 shown in FIG. 8.

FIG. 9 shows an example of a configuration for calculating the corrected detection angle φ0 in the angle computing section 28 shown in FIG. 8. The angle computing section 28 includes an outer product computing section 50, output sections 52, 58, and 60, a loop filter 54, an angle updating section 56, a cosine storage section 62, a sine storage section 64, and multiplying sections 66, 68, 70, and 72. These components form a closed loop, and cause the detection angle φ to approach the reference angle θ' by repeatedly performing a computation using the correction values and the detection angle φ output by the angle updating section 56 on the magnetic field components Vx and Vy.

The outer product computing section 50 multiplies the output of the multiplying section 68 by the magnetic field component −Vx, multiplies the output of the multiplying section 66 by the magnetic field component Vy, and outputs the sum of these products. The multiplying sections 66 and 68 output values corresponding to the correction values $A_2$ and $B_2$ and the detection angle $\varphi$ output by the angle updating section 56. The output of the outer product computing section 50 of the present example is provided by the expression shown below. In the present example, since a configuration is used that applies negative feedback such that $\varphi \approx \theta'$, $\sin(\theta'-\varphi)$ is approximated as $\theta'-\varphi$ and $\cos\beta$ is approximated as 1 for $\beta \ll 1$.

$$V'(\theta') = -Vx(\theta') \cdot \frac{\sin(\phi+B_2)}{1-A_2} + Vy(\theta') \cdot \frac{\cos(\phi-B_2)}{1+A_2} \quad (19)$$

$$= \sin(\theta'-\phi)\cos 2\beta - \frac{Ox}{1+\alpha}\sin(\phi-\beta) + \frac{Oy}{1-\alpha}\cos(\phi+\beta)$$

$$\cong (\theta'-\phi) - \frac{Ox}{1+\alpha}\sin(\phi-\beta) + \frac{Oy}{1-\alpha}\cos(\phi+\beta)$$

The output section 52 subtracts the output of the multiplying section 70 and the output of the multiplying section 72 from the output V' of the outer product computing section 50. The multiplying section 70 outputs the product of the output of the multiplying section 66 and the correction value $B_1$. The multiplying section 72 outputs the product of the output of the multiplying section 68 and the correction value $A_1$.

The loop filter 54 passes a prescribed frequency component of the output V'' of the output section 52. The angle updating section 56 increases or decreases the detection angle $\varphi$ according to the output of the loop filter 54. The angle updating section 56 updates the detection angle $\varphi$ such that the output V'' approaches zero. The detection angle $\varphi(0)$ at the time when i=0 may be registered in the angle updating section 56 as the initial value of the detection angle $\varphi$. The angle updating section 56 updates and outputs the detection angle $\varphi$ every time the output V'' is input thereto. The angle updating section 56 outputs this output as the corrected detection angle $\varphi o$, and also feeds this output back into the loop as the detection angle $\varphi$.

The output section 58 subtracts the correction value $B_2$ from the detection angle $\varphi$, and outputs the result. The output section 60 adds the correction value $B_2$ to the detection angle $\varphi$, and outputs the result. The cosine storage section 62 outputs a cosine value corresponding to the angle output by the output section 58. The sine storage section 64 outputs a sine value corresponding to the angle output by the output section 60. The multiplying section 66 outputs the product of the output of the cosine storage section 62 and $1/(1+A_2)$. The multiplying section 68 outputs the product of the sine storage section 64 and $1/(1-A_2)$.

According to such a process, the output V'' of the output section 52 is shown in the expression below.

$$V''(\theta') = V'(\theta') - A_1 \cdot \frac{\sin(\phi+B_2)}{1-A_2} - B_1 \cdot \frac{\cos(\phi-B_2)}{1+A_2} \quad (20)$$

$$\cong (\theta'-\phi)$$

According to the configuration shown in FIG. 9, it is possible to reduce each error component. Furthermore, the output of the loop is stabilized in a state where the reference angle $\theta'$ and the detection angle $\varphi$ are approximately equal. In other words, the detection angle detected by the angle computing section 28 and the corrected detection angle $\varphi o$ are corrected to approach the reference angle $\theta'$. According to the processing of the second embodiment example as well, the same results as in the example shown in FIG. 6 are achieved.

Third Embodiment Example

Figure 10:
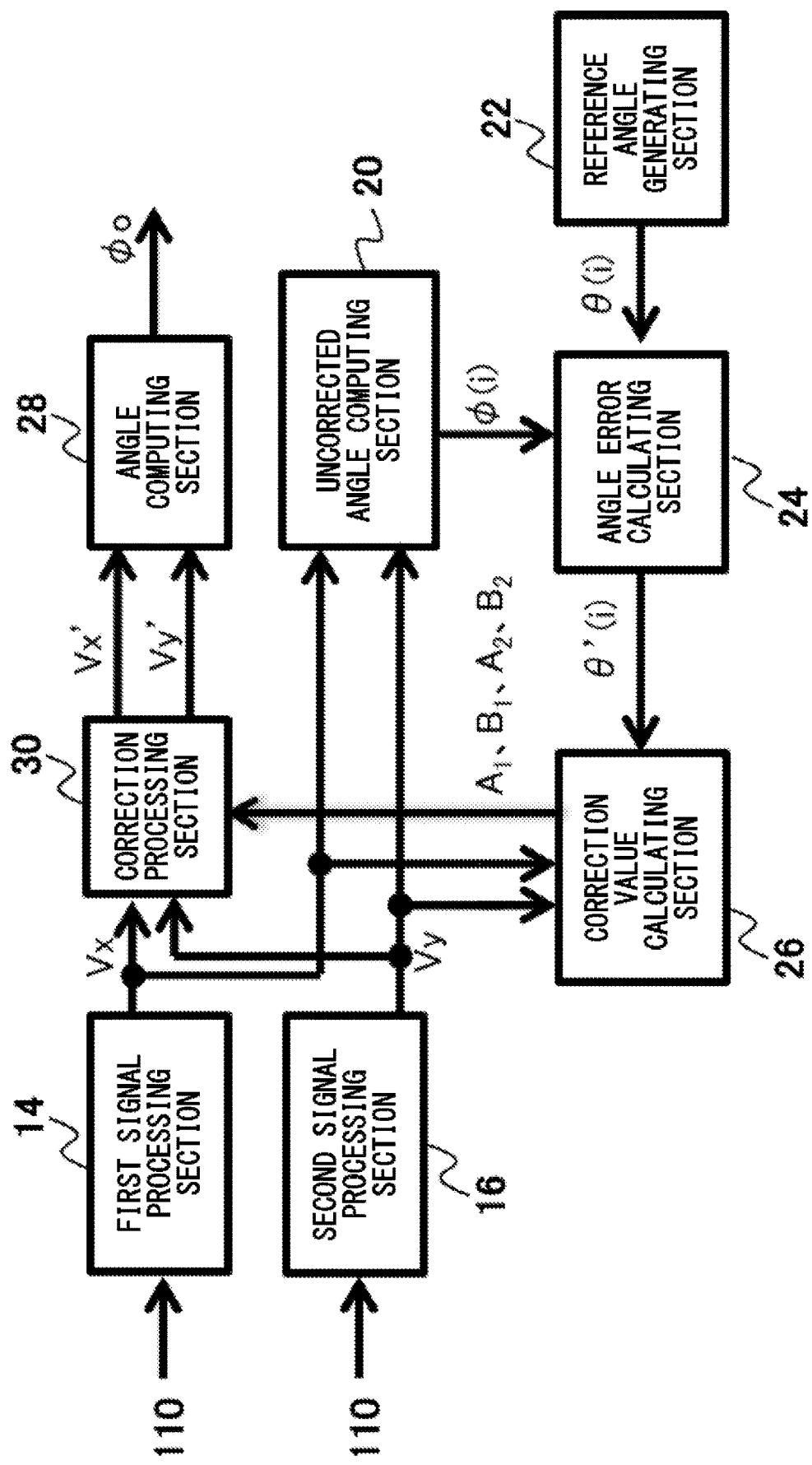
FIG. 10 shows a rotational angle detection apparatus 100 according to a third embodiment example of the present invention.

FIG. 10 shows a rotational angle detection apparatus 100 according to a third embodiment example of the present invention. The rotational angle detection apparatus 100 of the present example has a configuration similar to that of the rotational angle detection apparatus 100 according to the first embodiment example. The rotational angle detection apparatus 100 according to the first embodiment example calculates the correction values by performing a Fourier transform on the reference angle error $\Delta\theta(i)$ with the detection reference angle $\theta'(i)$. In contrast to this, the correction value calculating section 26 of the third embodiment example calculates the correction values based on the results of a Fourier transform process performed on the magnetic field components Vx and Vy with the detection reference angle $\theta'(i)$. The other processes in the third embodiment example are the same as in the first embodiment example.

Figure 11:
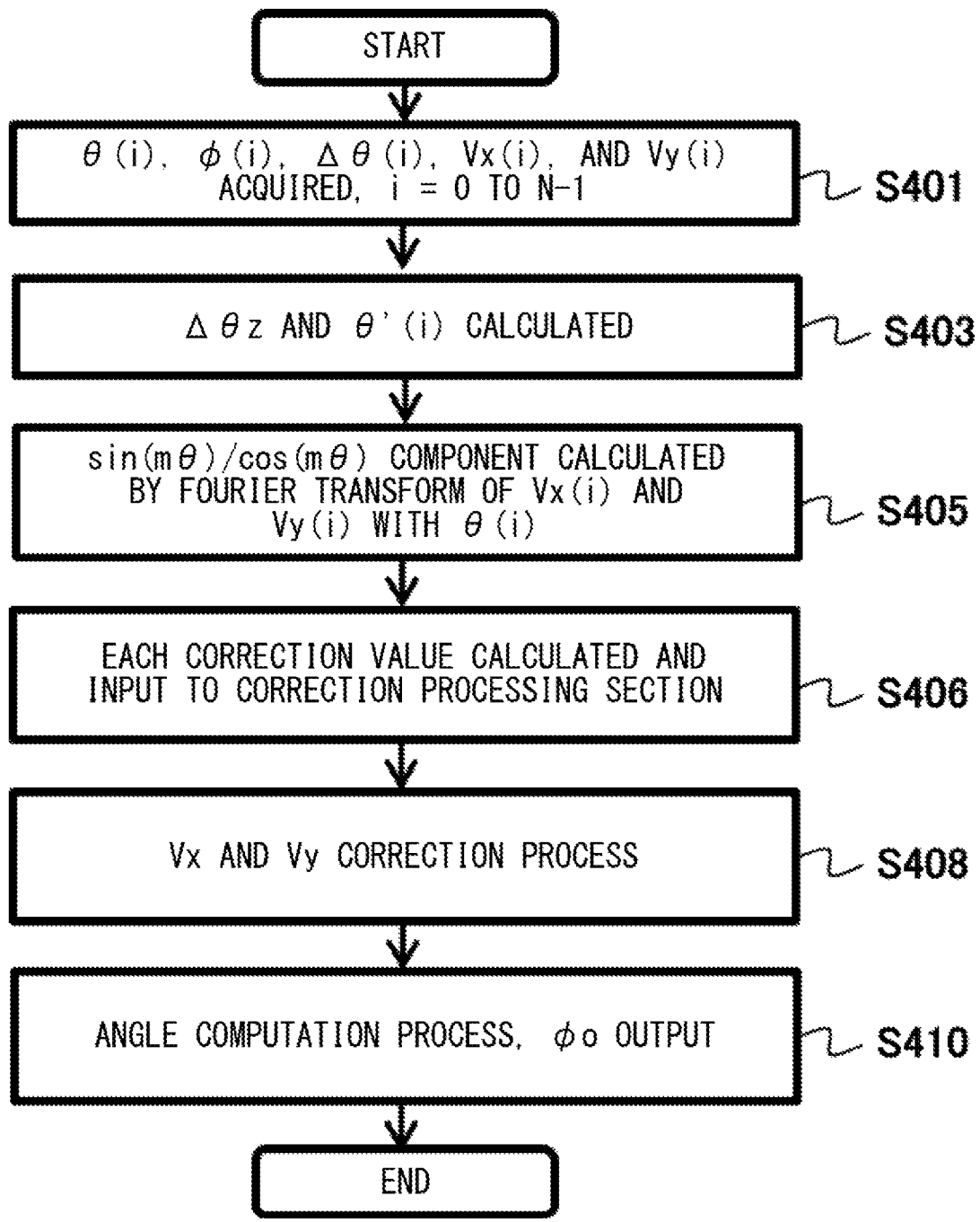
FIG. 11 is a flow chart showing an example of the operation of the rotational angle detection apparatus 100 shown in FIG. 10.

FIG. 11 is a flow chart showing an example of the operation of the rotational angle detection apparatus 100 shown in FIG. 10. First, at S401, the reference angle generating section 22 generates the reference angle $\theta(i)$, the uncorrected angle computing section 20 generates the uncorrected detection angle $\varphi(i)$, and the angle error calculating section 24 generates the angle error $\theta(i)$. Furthermore, the correction value calculating section 26 acquires the magnetic field components Vx and Vy.

Next, at S403, the angle error calculating section 24 calculates the steady-state error $\Delta\theta z$ and the detection reference angle $\theta'(i)$. The process of S403 is similar to the process of S403 in FIG. 3.

Next, the correction value calculating section 26 performs a Fourier transform on each of the magnetic field components Vx and Vy with the detection reference angle $\theta'(i)$ (S405), and calculates the correction values based on the results of the Fourier transform (S406). The correction value calculating section 26 of the present example calculates the correction values based on the 0-th order components and the first order components of the Fourier transforms of the magnetic field components Vx and Vy. The correction value calculating section 26 may calculate the correction values based on the expressions shown below.

$$Vx(\theta') = Vx_0 + ax_1\sin\theta' + bx_1\cos\theta' \quad (21)$$

$$Vy(\theta') = Vy_0 + ay_1\sin\theta' + by_1\cos\theta' \quad (22)$$

$$A_1 = -Vx_0 = -Ox \quad (23)$$

$$B_1 = +Vy_0 = +Oy \quad (24)$$

$$A_2 = \frac{-1+\frac{ay_1}{bx_1}}{+1+\frac{ay_1}{bx_1}} = -\alpha \quad (25)$$

$$B_2 = \frac{\tan^{-1}\frac{ax_1}{bx_1} + \tan^{-1}\frac{by_1}{ay_1}}{2} = -\beta \quad (26)$$

At S403, the number of angle states (i) used to calculate the steady-state error $\Delta\theta z$ (i.e. the average value of the angle error) may be the same as the number (N) of angle states used to perform the Fourier transform on the magnetic field components Vx and Vy by the correction value calculating section at S405. An example of the correspondence between the reference angle $\theta(i)$, the uncorrected detection angle $\varphi(i)$, the reference angle error $\Delta\theta(i)$, the detection reference angle $\Delta'(i)$, and the magnetic field components Vx(i) and Vy(i) in the third embodiment example is shown in Table 3.

TABLE 3

| i | $\theta(i)$ | $\phi(i)$ | $\Delta\theta(i)$ | $\theta'(i)$ | Vx(i) | Vy(i) |
|---|---|---|---|---|---|---|
| 0 | $\phi(0)$ | $\phi(0)$ | 0 | $\theta(1) + \Delta\theta z$ | Vx(0) | Vy(0) |
| 1 | $\phi(0) + 1 \times 360/N$ | $\phi(1)$ | $\phi(1) - \theta(1)$ | $\theta(2) + \Delta\theta z$ | Vx(1) | Vy(1) |
| 2 | $\phi(0) + 2 \times 360/N$ | $\phi(2)$ | $\phi(2) - \theta(2)$ | $\theta(3) + \Delta\theta z$ | Vx(2) | Vy(2) |
| ... | ... | ... | ... | ... | ... | ... |
| ... | ... | ... | ... | ... | ... | ... |
| ... | ... | ... | ... | ... | ... | ... |
| N-2 | $\phi(0) + (N-2) \times 360/N$ | $\phi(N-2)$ | $\phi(N-2) - \theta(N-2)$ | $\theta(N-2) + \Delta\theta z$ | Vx(N-2) | Vy(N-2) |
| N-1 | $\phi(0) + (N-1) \times 360/N$ | $\phi(N-1)$ | $\phi(N-1) - \theta(N-1)$ | $\theta(N-1) + \Delta\theta z$ | Vx(N-1) | Vy(N-1) |

The correction processing section 30 corrects the magnetic field components Vx and Vy based on the correction values calculated by the correction value calculating section 26 (S408). Furthermore, the angle computing section 28 generates the corrected detection angle $\varphi o$ based on the corrected magnetic field components Vx and Vy (S410).

Figure 12:
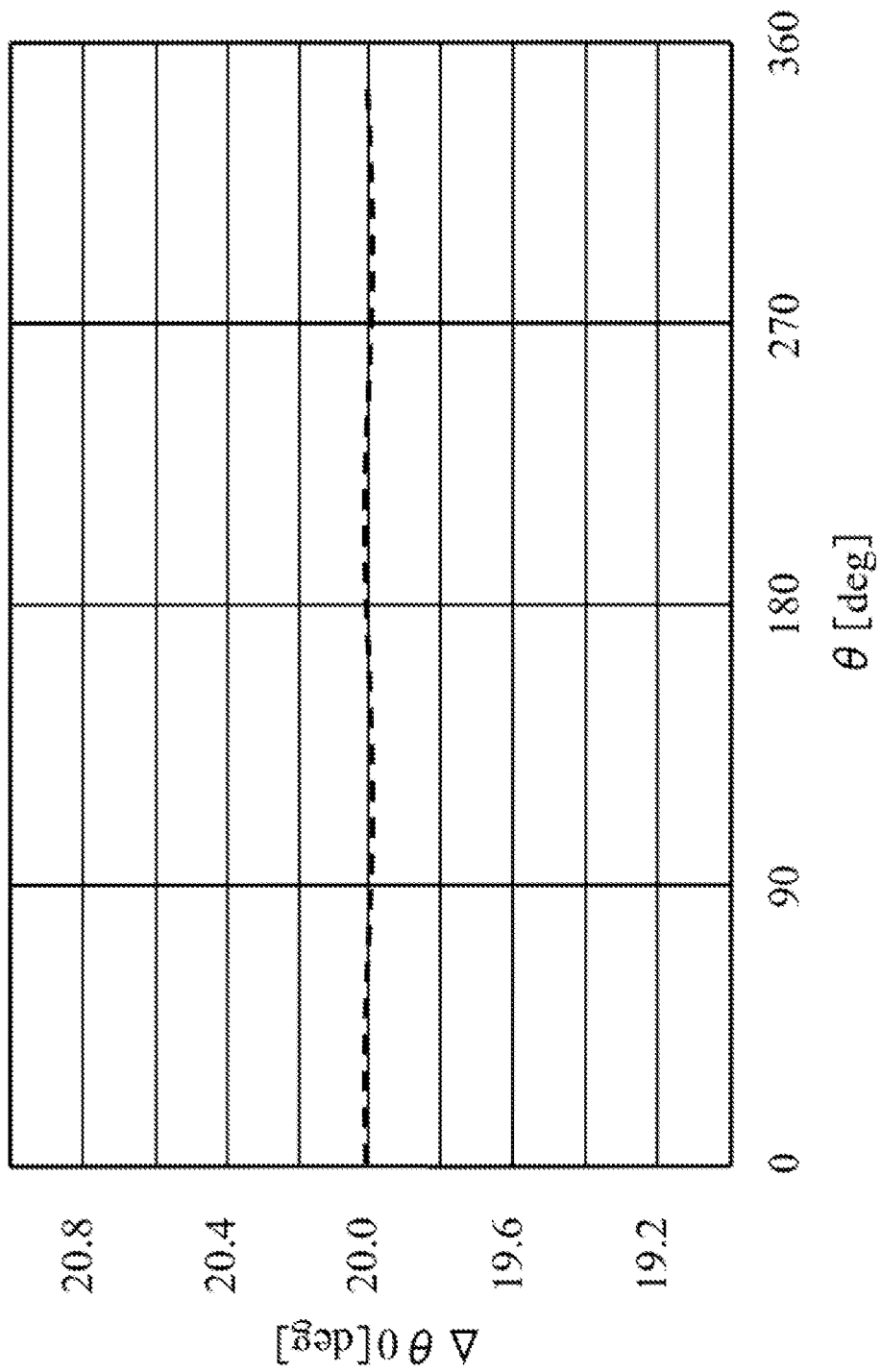
FIG. 12 shows the angle error $\Delta\theta_0$ in the third embodiment example.

FIG. 12 shows the angle error $\Delta\theta_0$ in the third embodiment example. In FIG. 12, Ox=0.02, Oy=−0.01, α=0.2, β=2 (deg), and $\Delta\theta z$=20 (deg). In the third embodiment example, the peak-to-peak value of the angle error $\Delta\theta_0$ was 0.03 degrees. In the third embodiment example, the linearity of the detection angle $\varphi o$ is improved more than in the first embodiment example.

Fourth Embodiment Example

Figure 13:
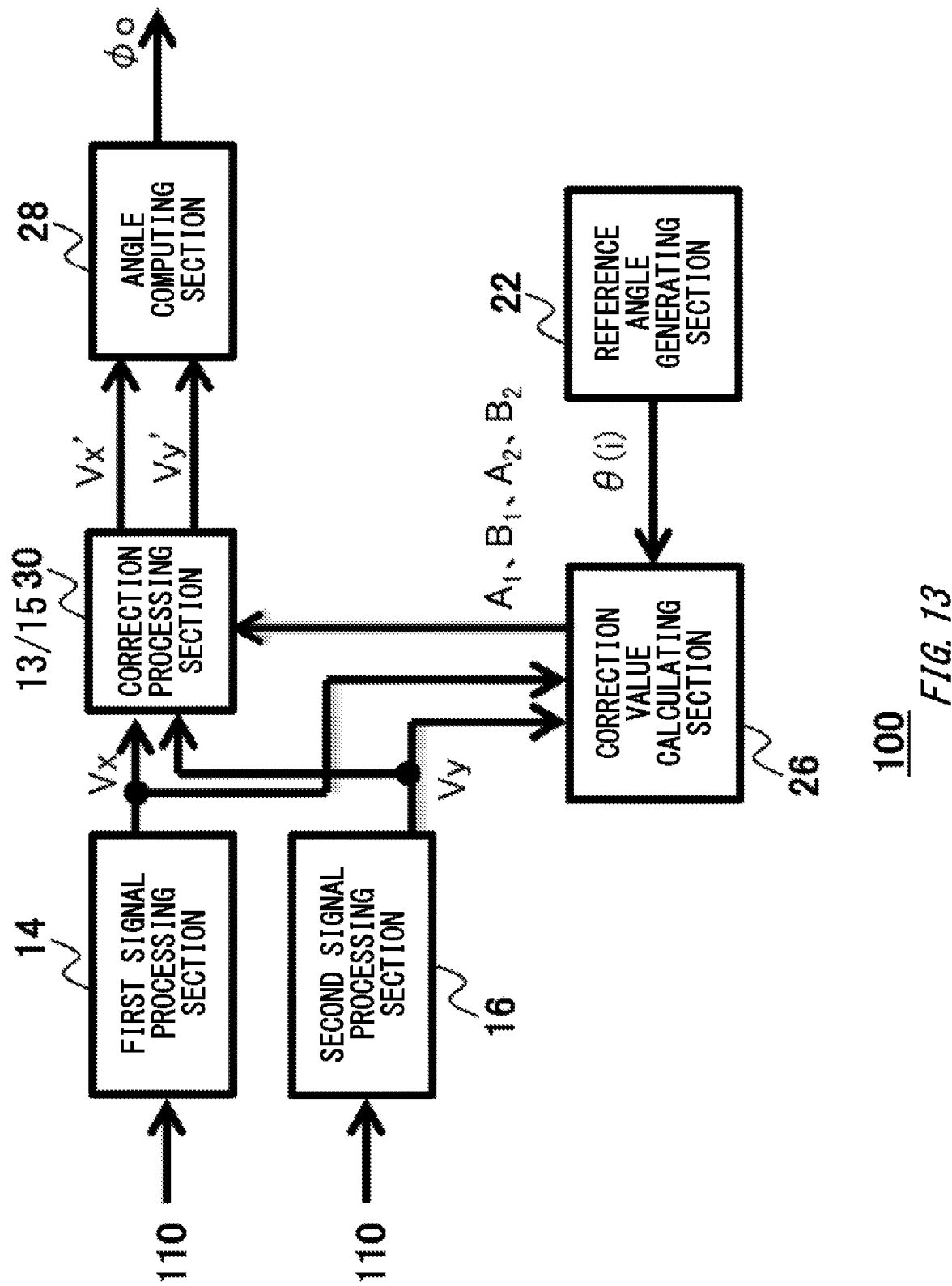
FIG. 13 shows an example of the configuration of a rotational angle detection apparatus 100 according to a fourth embodiment example of the present invention.

FIG. 13 shows an example of the configuration of a rotational angle detection apparatus 100 according to a fourth embodiment example of the present invention. The rotational angle detection apparatus 100 according to the fourth embodiment example has a configuration in which the uncorrected angle computing section 20 and the angle error calculating section 24 are removed from the configuration of the rotational angle detection apparatus 100 according to the third embodiment example. In the rotational angle detection apparatus 100 according to the fourth embodiment example, the correction value calculating section 26 calculates the correction values based on the results of the Fourier transforms performed on the magnetic field components Vx and Vy using the reference angle $\theta(i)$.

Figure 14:
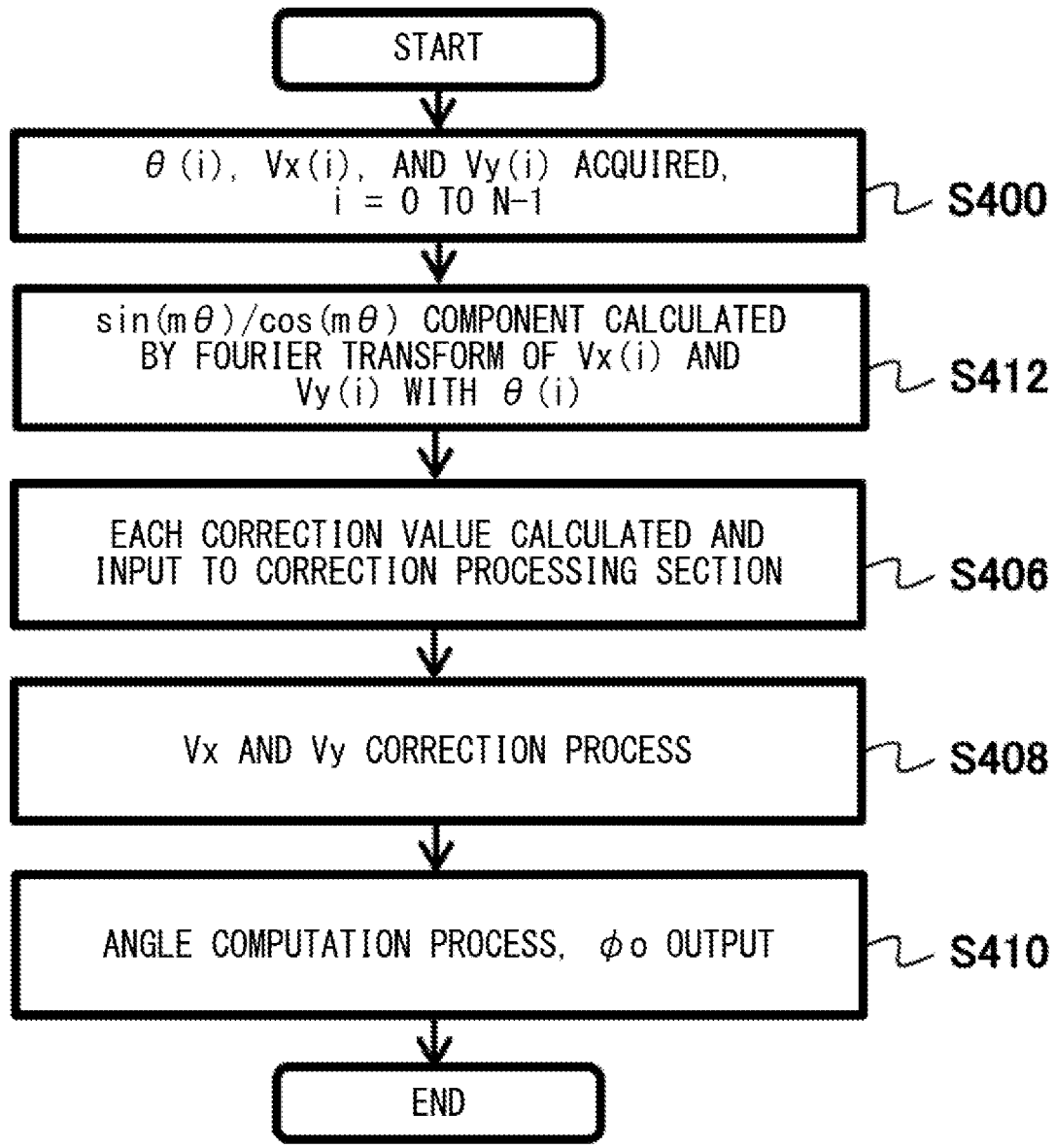
FIG. 14 is a flow chart showing an example of the operation of the rotational angle detection apparatus 100 shown in FIG. 13.

FIG. 14 is a flow chart showing an example of the operation of the rotational angle detection apparatus 100 shown in FIG. 13. First, the reference angle generating section 22 generates the reference angle $\theta(i)$ and the correction value calculating section 26 acquires the reference angle $\theta(i)$ and the magnetic field components Vx and Vy (S400).

Next, the correction value calculating section 26 performs the Fourier transforms on the magnetic field components Vx and Vy, using the reference angle $\theta(i)$ (S412). The Fourier transforms of the magnetic field components Vx and Vy are provided by the expressions below.

$$Vx(\theta) = Vx_0 = \alpha x_1 \sin\theta + bx_1 \cos\theta \quad (27)$$

$$Vy(\theta) = Vy_0 = \alpha y_1 \sin\theta + by_1 \cos\theta \quad (28)$$

Here, $Vx_0$, $Vy_0$, $ax_1$, $ay_1$, $bx_1$, and $by_1$ are amplitude values of the respective components in the Fourier transform.

The amplitude values of the components shown in Expression 27 and Expression 28 correspond respectively to the error components shown in Expression 1 and Expression 2. The correction value calculating section 26 may calculate the correction values from the amplitude values of the respective components in Expression 27 and Expression 28. The correction values calculated by the correction value calculating section 26 are provided by the expressions below, for example. The correction values $A_1$, $B_1$, and $B_2$ may be the same as the correction values $A_1$, $B_1$, and $B_2$ in the third embodiment example.

$$\Delta\theta z = \frac{-\tan^{-1}\dfrac{ax_1}{bx_1} + \tan^{-1}\dfrac{by_1}{a_{y1}}}{2} \quad (29)$$

$$A_2 = \frac{-\cos(B_2 + \Delta\theta z) + \dfrac{ay_1}{bx_1}\cos(-B_2 + \Delta\theta z)}{\cos(B_2 + \Delta\theta z) + \dfrac{ay_1}{bx_1}\cos(-B_2 + \Delta\theta z)} = -\alpha \quad (30)$$

An example of the correspondence between the reference angle $\theta(i)$ and the magnetic field components Vx(i) and Vy(i) in the fourth embodiment example is shown in Table 4.

TABLE 4

| i | $\theta(i)$ | Vx(i) | Vy(i) |
|---|---|---|---|
| 0 | $\phi(0)$ | Vx(0) | Vy(0) |
| 1 | $\phi(0) + 1 \times 360/N$ | Vx(1) | Vy(1) |
| 2 | $\phi(0) + 2 \times 360/N$ | Vx(2) | Vy(2) |
| ... | ... | ... | ... |
| ... | ... | ... | ... |
| ... | ... | ... | ... |
| N − 2 | $\phi(0) + (N − 2) \times 360/N$ | Vx(N − 2) | Vy(N − 2) |
| N − 1 | $\phi(0) + (N − 1) \times 360/N$ | Vx(N − 1) | Vy(N − 1) |

The correction value calculating section 26 inputs the calculated correction values to the correction processing section 30 (S406). The correction processing section 30 corrects the magnetic field values Vx and Vy based on the correction values (S408). The correction process in S408 is the same as the process of S408 in FIG. 11. The angle computing section 28 generates the corrected detection angle $\varphi o$ from the corrected magnetic field components Vx and Vy (S410). The process in S410 is the same as the process of S410 in FIG. 11.

As shown in Expression 29 and Expression 30, the correction value calculating section 26 of the present example also calculates the correction values while taking the steady-state error $\Delta\theta z$ into consideration. Therefore, the peak-to-peak value of the angle error can be made small.

Figure 15:
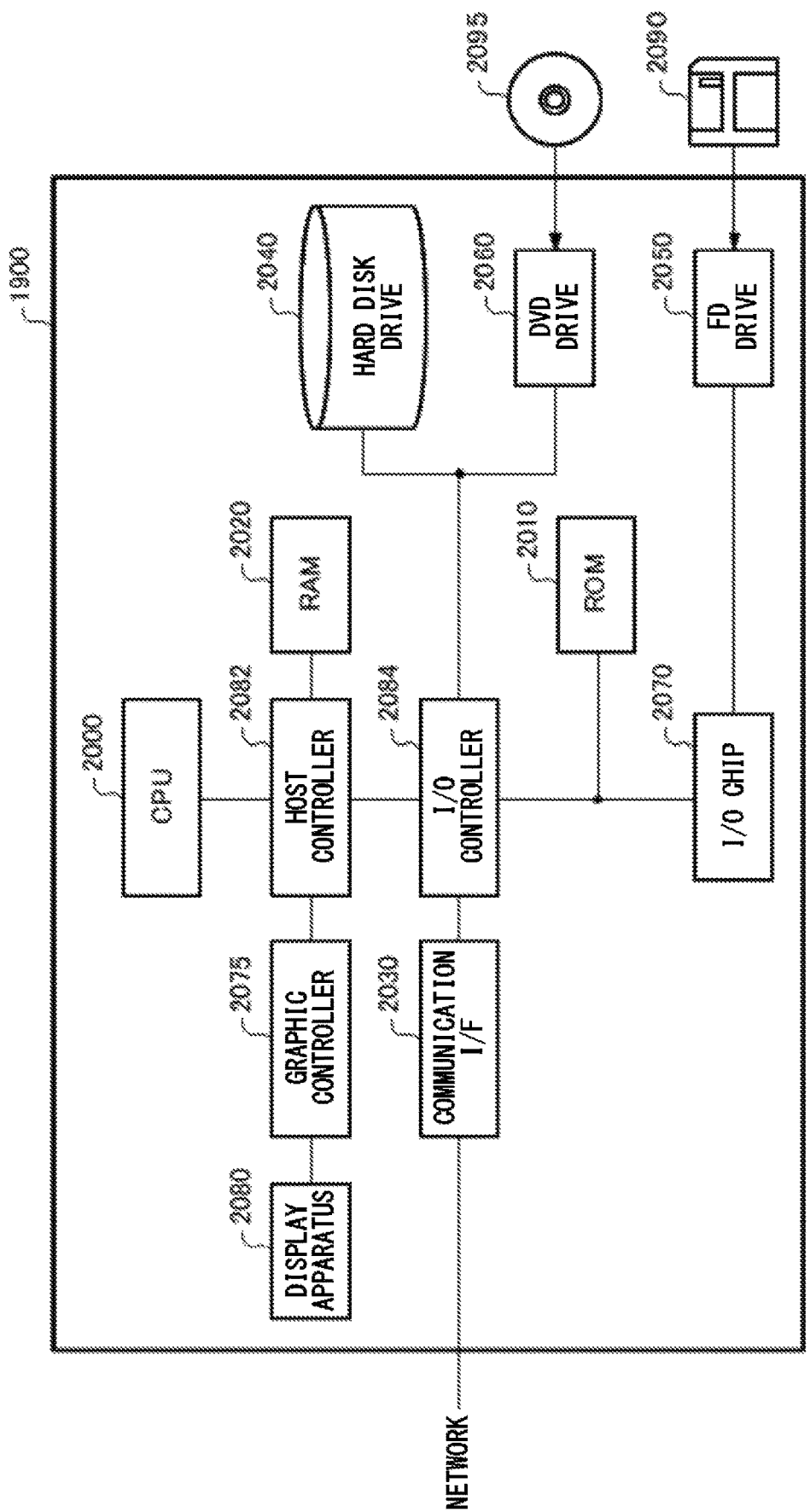
FIG. 15 shows an example of a hardware configuration of a computer 1900 that functions as the rotational angle detection apparatus 100

FIG. 15 shows an example of a hardware configuration of a computer 1900 that functions as the rotational angle detection apparatus 100. Furthermore, a plurality of computers may function together as the rotational angle detection apparatus 100.

The computer 1900 according to the present embodiment is provided with a CPU peripheral including a CPU 2000, a RAM 2020, a graphic controller 2075, and a display apparatus 2080, all of which are connected to each other by a host controller 2082; an input/output section including a communication interface 2030, a hard disk drive 2040, and a DVD drive 2060 that are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the display apparatus 2080. Instead, the graphic controller 2075 may internally include the frame buffer storing the image data generated by the CPU 2000 or the like.

The input/output controller 2084 connects the communication interface 2030 serving as a relatively high speed input/output apparatus, and the hard disk drive 2040, and a DVD drive 2060 to the host controller 2082. The communication interface 2030 communicates with other apparatuses via a network. The hard disk drive 2040 stores the programs, such as a display program, and data used by the CPU 2000 housed in the computer 1900. The DVD drive 2060 reads a program or data from a DVD-ROM 2095, and provides the program or data to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to the input/output controller 2084 along with each of the input/output apparatuses via, a parallel port, a serial port, a keyboard port, a mouse port, or the like.

The programs provided to the hard disk drive 2040 via the RAM 2020 are stored in a storage medium, such as the flexible disk 2090, the DVD-ROM 2095, or an IC card, and provided by a user. The programs are read from storage medium, installed in the hard disk drive 2040 inside the computer 1900 via the RAM 2020, and performed by the CPU 2000. The programs are installed in the computer 1900 and cause the computer 1900 to function as each component of the rotational angle detection apparatus 100.

The information processes recorded in these programs are read by the computer 1900 to cause the computer 1900 to function as software and hardware described above, which are exemplified by the specific sections of at least some of the first signal processing section 14, the second signal processing section 16, the correction processing section 30, the angle computing section 28, the uncorrected angle computing section 20, the reference angle generating section 22, the angle error calculating section 24, and the correction value calculating section 26. With these specific means, a rotational angle detection apparatus 100 suitable for an intended use can be configured by realizing the calculations or computations appropriate for the intended use of the computer 1900 of the present embodiment.

For example, if there is communication between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the transmission buffer area or the like on the storage apparatus, such as the RAM 2020, the hard disk drive 2040, the flexible disk 2090, or the DVD-ROM 2095, and send this transmission data to the network, and to write data received from the network onto a reception buffer area on the storage apparatus. In this way, the communication interface 2030 may transmit data to and from the storage apparatus through DMA (Direct Memory Access). As another possibility, the CPU 2000 may transmit the data by reading the data from the storage apparatus or communication interface 2030 that are the origins of the transmitted data, and writing the data onto the communication interface 2030 or the storage apparatus that are the transmission destinations.

The CPU 2000 may perform various processes on the data in the RAM 2020 by reading into the RAM 2020, through DMA transmission or the like, all or a necessary portion of the database or files stored in the external apparatus such as the hard disk drive 2040, the DVD drive 2060 (DVD-ROM 2095), the flexible disk drive 2050 (flexible disk 2090). The CPU 2000 writes the processed data back to the external apparatus through DMA transmission or the like. In this process, the RAM 2020 is considered to be a section that temporarily stores the content of the external storage apparatus, and therefore the RAM 2020, the external apparatus, and the like in the present embodiment are referred to as a memory, a storage section, and a storage apparatus. The variety of information in the present embodiment, such as the variety of programs, data, tables, databases, and the like are stored on the storage apparatus to become the target of the information processing. The CPU 2000 can hold a portion of the RAM 2020 in a cache memory and read from or write to the cache memory. With such a configuration as well, the cache memory serves part of the function of the RAM 2020, and therefore the cache memory is also included with the RAM 2020, the memory, and/or the storage apparatus in the present invention, except when a distinction is made.

The CPU 2000 executes the various processes such as the computation, information processing, condition judgment, searching for/replacing information, and the like included in the present embodiment for the data read from the RAM 2020, as designated by the command sequence of the program, and writes the result back onto the RAM 2020. For example, when performing condition judgment, the CPU 2000 judges whether a variable of any type shown in the present embodiment fulfills a condition of being greater than, less than, no greater than, no less than, or equal to another variable or constant. If the condition is fulfilled, or unfulfilled, depending on the circumstances, the CPU 2000 branches into a different command sequence or acquires a subroutine.

The CPU 2000 can search for information stored in a file in the storage apparatus, the database, and the like. For example, in a case where a plurality of entries in which attribute values of a second attribute are associated with attribute values of a first attribute are stored in the storage apparatus, the CPU 2000 can obtain a second attribute value associated with a first attribute value that satisfies a prescribed condition, be searching for an entry in which the attribute value of the first attribute matches a designated condition, among the plurality of entries stored in the storage apparatus, and reading the attribute value of the second attribute stored in this entry.

The programs and modules shown above may also be stored in an external storage medium. In addition to the flexible disk 2090 and the DVD-ROM 2095, an optical storage medium such as a DVD, Blu-ray (registered Trademark), or a CD, a magneto-optical storage medium such as an MO, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10 . . . system; 14 . . . first signal processing section; 16 . . . second signal processing section; 20 . . . uncorrected angle computing section; 22 . . . reference angle generating section; 24 . . . angle error calculating section; 26 . . . correction value calculating section; 28 . . . angle computing section; 30 . . . correction processing section; 32, 34, 44, 46 . . . difference output section; 36, 38, 40, 42 . . . multiplying section; 50 . . . outer product computing section; 52, 58, 60 . . . output section; 54 . . . loop filter; 56 . . . angle updating section; 62 . . . cosine storage section; 64 . . . sine storage section; 66, 68, 70, 72 . . . multiplying section; 100 . . . rotational angle detection apparatus; 110 . . . magnetic field detection apparatus; 120 . . . magnetic field generation source; 200 . . . rotating body; 210 . . . rotational axis; 1900 . . . computer; 2000 . . . CPU; 2010 . . . ROM; 2020 . . . RAM; 2030 . . . communication interface; 2040 . . . hard disk drive; 2050 . . . flexible disk drive; 2060 . . . DVD drive; 2070 . . . input/output chip; 2075 . . . graphic controller; 2080 . . . display; 2082 . . . host controller; 2084 . . . input/output controller; 2090 . . . flexible disk; 2095 . . . DVD-ROM

What is claimed is:

1. A rotational angle detection apparatus that detects a rotational angle of a magnetic field generation source, comprising:
    a magnetic field detection apparatus including a planar detector for mounting orthogonal to a rotational axis of a rotating shaft having a magnetic field generation source at one end thereof to generate a magnetic field adjacent to the planar magnetic field detector, the magnetic field detection apparatus being configured to detect magnetic field components in at least two directions, and to output resulting detection data;
    a correction value calculating section that calculates correction values for correcting an angle error of the rotational angle, based on a steady-state error that does not depend on rotation of the magnetic field generation source;
    an angle computing section that calculates the rotational angle of the magnetic field generation source based on the detection data and the correction values, and outputs an angle signal indicating the rotational angle; and
    an angle error calculating section that calculates a reference angle error between a detection angle corresponding to the detection data and a reference angle in a first coordinate system in which the magnetic field generation source rotates, for each rotational angle for at least two angle states between which the rotational angle of the magnetic field generation source differs, wherein
    the correction value calculating section calculates the steady-state error based on an average value of the reference angle error in the at least two angle states.

2. The rotational angle detection apparatus according to claim 1, wherein
    the correction value calculating section calculates the correction values based on the steady-state error and the detection data output by the magnetic field detection apparatus for the at least two angle states between which the rotational angle of the magnetic field generation source differs.

3. The rotational angle detection apparatus according to claim 2, wherein
    the correction value calculating section calculates the correction values based on a result obtained by performing a Fourier transform on the reference angle error, using a detection reference angle obtained by adding the average value of the reference angle error to the reference angle.

4. The rotational angle detection apparatus according to claim 3, wherein
    the correction value calculating section calculates the average value of the reference angle error based on the detection data in a number of angle states equal to the number of angle states used to perform the Fourier transform on the reference angle error.

5. The rotational angle detection apparatus according to claim 2, wherein:
    the correction value calculating section calculates the correction values based on a median value of the reference angle error in the at least two angle states.

6. The rotational angle detection apparatus according to claim 1, further comprising:
    a first signal processing section that outputs a first signal corresponding to a magnetic field in a first direction detected by the magnetic field detection apparatus;
    a second signal processing section that outputs a second signal corresponding to a magnetic field in a second direction detected by the magnetic field detection apparatus; and a correction processing section that corrects the first signal and the second signal output by the first signal processing section and the second signal processing section, based on the correction values.

7. The rotational angle detection apparatus according to claim 1, further comprising:
a first signal processing section that outputs a first signal corresponding to a magnetic field in a first direction detected by the magnetic field detection apparatus; and
a second signal processing section that outputs a second signal corresponding to a magnetic field in a second direction detected by the magnetic field detection apparatus, wherein
the angle computing section calculates the rotational angle based on the correction values and the first signal and the second signal output by the first signal processing section and the second signal processing section.

8. The rotational angle detection apparatus according to claim 2, further comprising:
a first signal processing section that outputs a first signal corresponding to a magnetic field in a first direction detected by the magnetic field detection apparatus; and
a second signal processing section that outputs a second signal corresponding to a magnetic field in a second direction detected by the magnetic field detection apparatus, wherein
the correction value calculating section calculates the correction values based on results of a Fourier transform performed on the first signal output by the first signal processing section and the second signal output by the second signal processing section, using a detection reference angle obtained by adding the average value of the reference angle error to the reference angle.

9. The rotational angle detection apparatus according to claim 8, further comprising:
a correction processing section that corrects the first signal and the second signal output by the first signal processing section and the second signal processing section, based on the correction values, wherein
the angle computing section calculates the rotational angle based on the signals corrected by the correction processing section.

10. The rotational angle detection apparatus according to claim 8, wherein
the correction value calculating section calculates an average value of the reference angle error based on the detection data in a number of angle states equal to the number of angle states used to perform the Fourier transform on the first signal output by the first signal processing section and the second signal output by the second signal processing section.

11. The rotational angle detection apparatus according to claim 2, further comprising:
a first signal processing section that processes a first signal corresponding to a magnetic field in a first direction detected by the magnetic field detection apparatus; and
a second signal processing section that processes a second signal corresponding to a magnetic field in a second direction detected by the magnetic field detection apparatus, wherein
the correction value calculating section calculates the correction values based on results of the Fourier transform performed on the first signal output by the first signal processing section and the second signal output by the second signal processing section using a reference angle in the first coordinate system.

12. The rotational angle detection apparatus according to claim 11, further comprising:
a correction processing section that corrects the first signal and the second signal output by the first signal processing section and the second signal processing section, based on the correction values, wherein
the angle computing section calculates the rotational angle based on the signals corrected by the correction processing section.

13. A rotational angle detection apparatus comprising:
a magnetic field detection apparatus including a magnetic field detector for mounting orthogonal to a rotational axis of a rotating shaft having a magnetic field generator at one end thereof to generate a magnet field adjacent to the magnetic field detector;
a data acquiring section that acquires detection data in the magnetic field detection apparatus, in at least two angle states between which a rotational angle of the magnetic field generation source differs; and
a correction value calculating section that calculates correction values for correcting an angle error of the rotational angle corresponding to a difference between a first coordinate system in which the magnetic field generation source rotates and a second coordinate system of the magnetic field detection apparatus, based on the detection data in the at least two angle states and a steady-state error of the rotational angle corresponding to the difference between the first coordinate system and the second coordinate system.

14. A method of determining an angular relationship between a rotating shaft having a magnetic field generator on one end thereof, and a planar detector orthogonal to a rotational axis of the rotating shaft, comprising:
detecting a first component of a magnetic field generated at one end of a rotating shaft, the first component being in a first direction along a planar magnetic field detector, and a second component of the magnetic field in a second direction along the planar magnetic field detector 90 degrees rotated from the first direction, the first component and the second component together forming detection data;
determining a rough rotational angle of the rotating shaft in relation to the planar magnetic field detector based on the detection data;
correcting the determined rough rotational angle based on a known steady-state error in the detection data that is independent of rotation of the rotating magnetic field to provide an error-corrected rotational angle;
calculating a first reference angle error between the rough rotational angle in a first angle state and a reference angle in a first coordinate system in which the rotating magnetic field rotates;
calculating a second reference angle error between the rough rotational angle in a second angle state, the second angle state being different from the first angle state; and
outputting an angle signal indicating the rotational angle of the rotating shaft in relation to the planar magnetic field detector, wherein
the steady-state error in the detection data is based on an average of the first reference angle error and the second reference angle error.

* * * * *